United States Patent
Yasuda et al.

(10) Patent No.: US 6,818,913 B2
(45) Date of Patent: Nov. 16, 2004

(54) METHOD AND APPARATUS FOR READING IMAGE INFORMATION BY USE OF STIMULABLE PHOSPHOR, AND SOLID-STATE IMAGE DETECTOR

(75) Inventors: Hiroaki Yasuda, Kaisei-machi (JP); Shinji Imai, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/792,035

(22) Filed: Feb. 26, 2001

(65) Prior Publication Data

US 2001/0020690 A1 Sep. 13, 2001

(30) Foreign Application Priority Data

Feb. 25, 2000 (JP) ........................................ 2000/050201

(51) Int. Cl.[7] .............................................. G03B 42/08
(52) U.S. Cl. ...................................................... 250/586
(58) Field of Search ........................................ 250/586

(56) References Cited

U.S. PATENT DOCUMENTS

| | | | |
|---|---|---|---|
| 4,272,477 A | | 6/1981 | Hagedorn |
| 4,485,302 A | * | 11/1984 | Tanaka et al. ............... 250/585 |
| 4,749,861 A | * | 6/1988 | Watanabe .................... 250/586 |
| 4,816,679 A | | 3/1989 | Sunagawa et al. ......... 250/327.2 |
| 4,922,103 A | | 5/1990 | Kawajiri et al. ........... 250/327.2 |
| 4,926,045 A | * | 5/1990 | Hosoi et al. ................. 250/585 |
| 4,931,642 A | * | 6/1990 | Hosoi et al. ................. 250/586 |
| 5,195,118 A | * | 3/1993 | Nudelman et al. .......... 378/98.2 |
| 5,644,142 A | * | 7/1997 | Namiki et al. ............... 250/586 |

FOREIGN PATENT DOCUMENTS

| | | | | |
|---|---|---|---|---|
| JP | 55-12492 A | 1/1980 | | |
| JP | 56-11395 A | 2/1981 | ............ | G21K/4/00 |
| JP | 58-121874 A | 7/1983 | ............ | H04N/5/32 |
| JP | 60-111568 A | 6/1985 | | |
| JP | 60-236354 A | 11/1985 | | |
| JP | 6-290714 A | * 10/1994 | ............ | H01J/29/45 |
| JP | 7-76800 B2 | 8/1995 | ............ | G21K/4/00 |

OTHER PUBLICATIONS

Anonymous, "Radiographic solid state imager using photoconductive, electroluminescent, and photostimulable storage phosphor layers," Oct. 20, 1992, Research Disclosures, 343029.*

Anonymous, "Radiographic process and solid state imager in which a photoconductivity image is derived electrically from a photoconductive layer adjacent a photostimulable storage phosphor layer," Sep. 20, 1992, Research Disclosures, 342064.*

Patent Abstract of Japan 56011395 Feb. 4, 1981.
Patent Abstract of Japan 58121874 Jul. 20, 1983.

* cited by examiner

*Primary Examiner*—Constantine Hannaher
(74) *Attorney, Agent, or Firm*—Sughrue Mion, PLLC

(57) ABSTRACT

An image recording sheet and a solid-state image detector are used. The sheet has a stimulable phosphor layer laminated on a base, and the solid-state image detector includes a photoconductive layer containing amorphous selenium as its main component and electrodes disposed on opposite sides of the photoconductive layer. An electric field is applied across the photoconductive layer so that avalanche amplification is obtained within the photoconductive layer. The sheet is scanned under the electric field with stimulating light of wavelength of about 600 nm, and photostimulated luminescence light of wavelength of about 400 nm emitted from the fluorescent layer is incident on the photoconductive layer via an optical guide and a stimulating light cut filter. Electric charge generated within the photoconductive layer is detected by a current detecting circuit, whereby a radiation image signal is obtained.

18 Claims, 13 Drawing Sheets

F I G. 1A
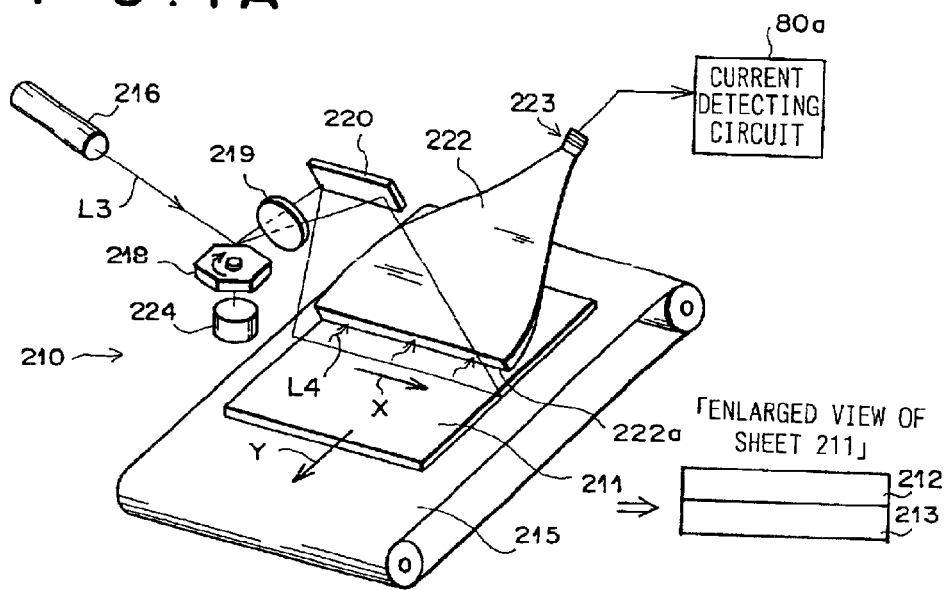
F I G. 1B
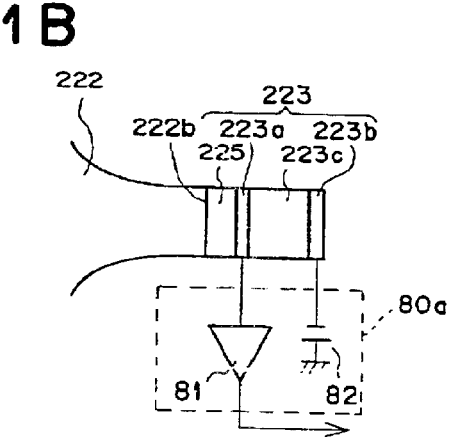

F I G. 3A
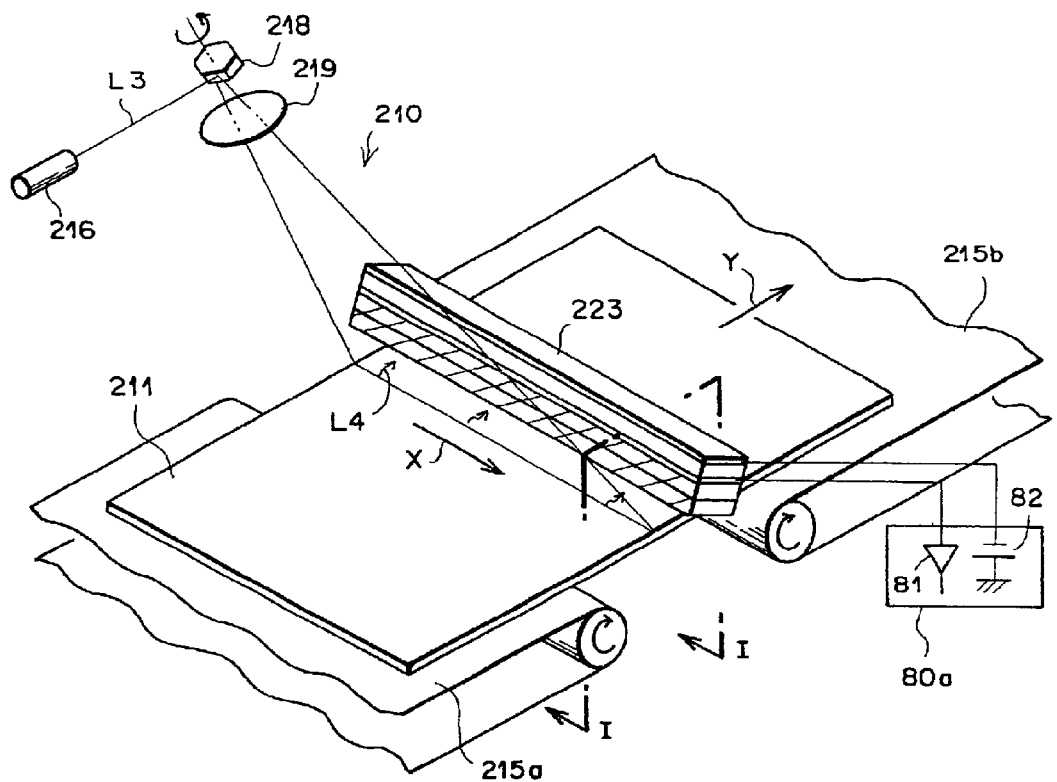
F I G. 3B
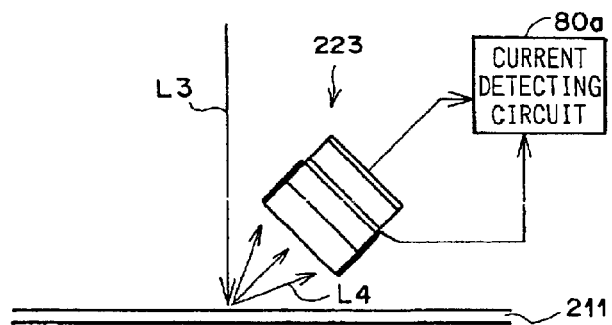

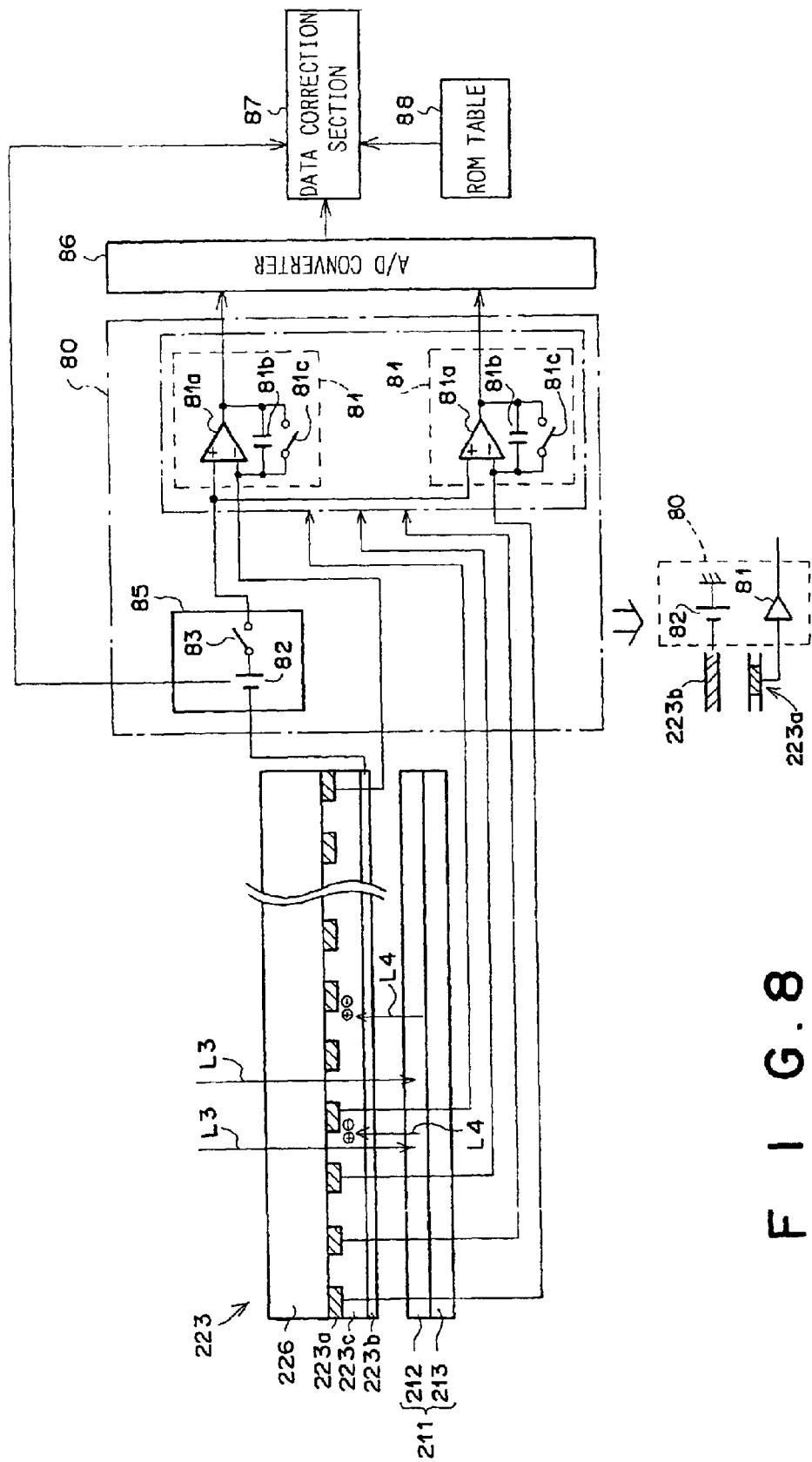
F I G. 8

F I G. 12A
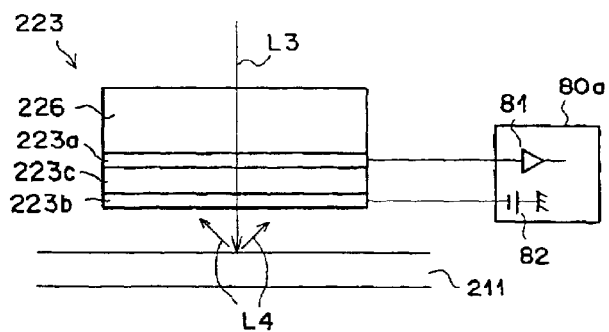
F I G. 12B
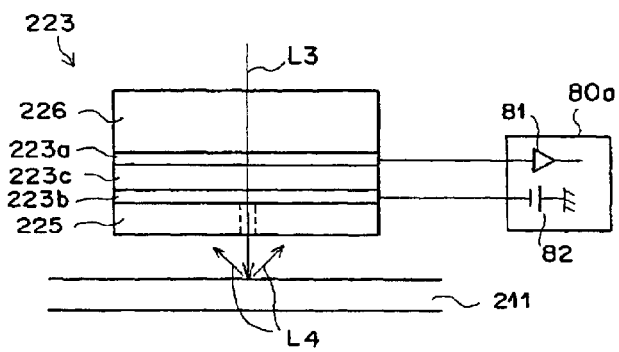
F I G. 12C
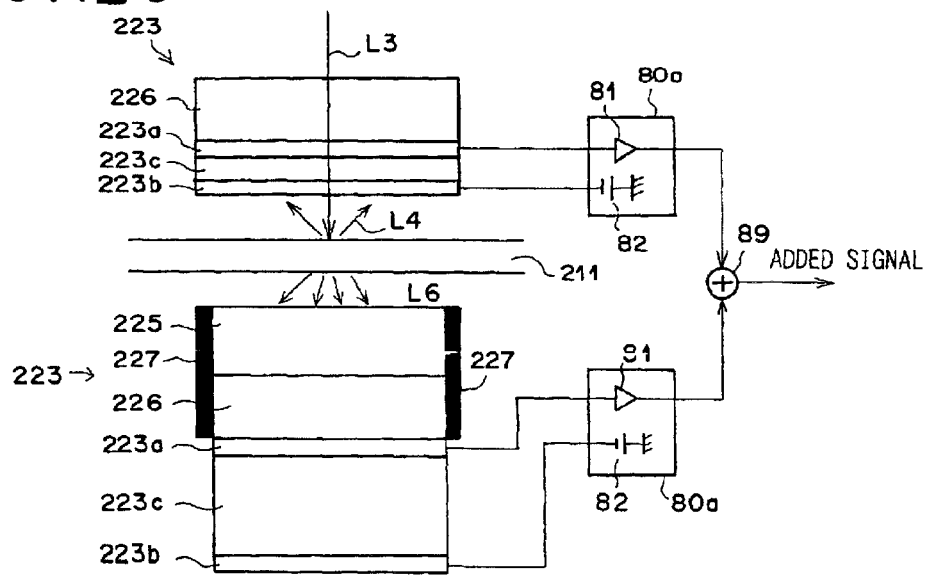

F I G. 14A
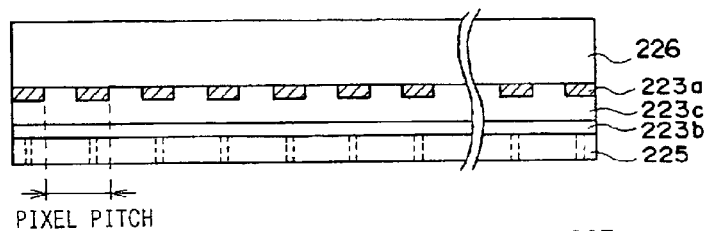
F I G. 14B
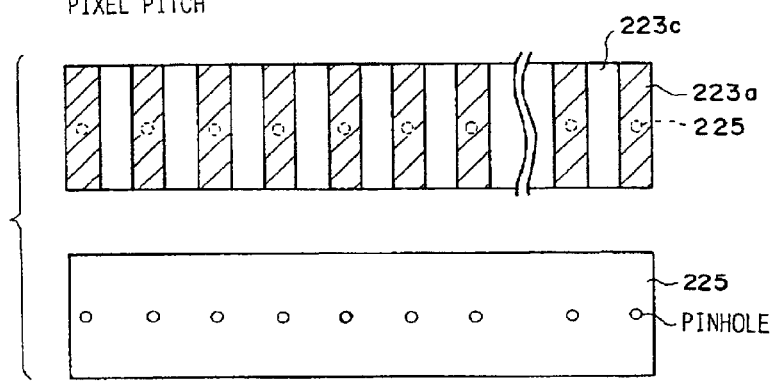
F I G. 14C
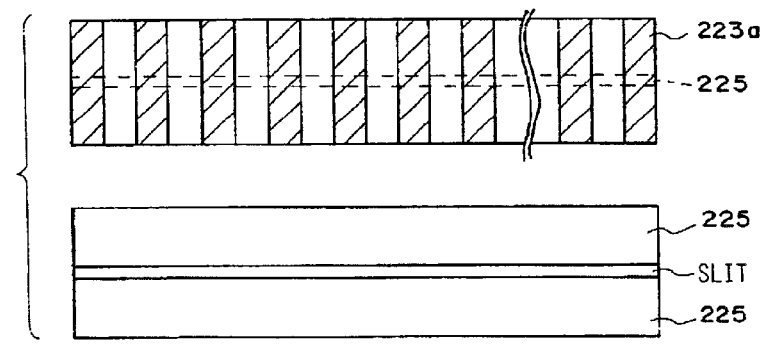

METHOD AND APPARATUS FOR READING IMAGE INFORMATION BY USE OF STIMULABLE PHOSPHOR, AND SOLID-STATE IMAGE DETECTOR

BACKGROUND OF THE INVENTION

1. Field of the Invention

The present invention relates to a method of and apparatus for reading image information by the use of a stimulable phosphor sheet, and a solid-state image detector used therefor.

2. Description of the Related Art

It has been well known in the art to read out image information using a stimulable phosphor sheet. The stimulable phosphor stores part of radiation energy when exposed to radiation, and exhibits photostimulated luminescence (PSL) according to the stored energy when exposed to stimulating light, such as visible light, etc. The radiation image information of a subject, such as a human body, etc., is temporarily recorded on a stimulable phosphor sheet. The stimulable phosphor sheet is scanned with a stimulating light beam such as a laser beam, and is caused to emit photostimulated luminescence light. The photostimulated luminescence light is photoelectrically detected and converted to an image signal carrying the radiation image information. As the image information reading apparatus, a wide variety of apparatus varying in manner of scanning and in the form of the photoelectric conversion means have been proposed.

For example, Japanese Unexamined Patent Publication Nos. 55(1980)-12492, 56(1981)-11395, etc. (hereinafter referred to as Reference 1), disclose an image reading method and apparatus, which is equipped with a stimulating light source for emitting a light spot, such as a laser beam, etc., as stimulating light; a photomultiplier (zero-dimensional photoelectric converter) with an electron doubling function of converting the photostimulated luminescence light, emitted from a sheet by irradiation of the light spot, to an electrical signal; and a stimulating-light scanning optical system for irradiating the light spot onto the sheet in a horizontal-scanning direction and, at the same time, moving the stimulating light and the photomultiplier (including an optical guide) relative to the sheet on the sheet surface in the vertical-scanning direction approximately perpendicular to the horizontal-scanning direction. In the image reading apparatus, the photostimulated luminescence light, emitted from the sheet when scanned with the light spot, is sequencially read by the photomultiplier.

The photomultiplier as a photoelectric converter has a high sensitivity to the wavelength of photostimulated luminescence light ranging from about 300 to 500 nm (blue light band) and a low sensitivity to the wavelength of stimulating light ranging from about 600 to 700 nm (red light band). The photomultiplier amplifies a micro signal resulting from feeble photostimulated luminescence light, by the external photoelectric effect so that it is not influenced by electrical noise.

The photomultiplier may have a circular or polygonal photomultiplier and may be used along with a focusing guide in the form of a dustpan, or may be employed as a long photomultiplier which has a photomultiplier having approximately the same length as the sheet width (width in the horizontal-scanning direction). In either case the photomultiplier is used as a zero-dimensional detector.

The apparatus employing the photomultiplier, however, has the following problems:

1) The photomultiplier has low shock resistance, because it is constructed of a hollow glass tube.
2) The photomultiplier is fairly difficult to be made in a thin form, as it uses a complex multistage dynode to double photons. The cost of manufacturing a long photomultiplier which has a width of 17 inches would be unduly high.
3) The quantum efficiency of the photocathode utilizing external photoelectric effect is low. The quantum efficiency with respect to photostimulated luminescence light of wavelengths 300 to 500 nm (blue light band) is normally as low as about 10 to 20%, whereas the quantum efficiency with respect to photostimulated luminescence light of wavelengths 600 to 700 nm (red light band) is relatively great and normally about 0.1 to 2%. For this reason, a special stimulating light cut filter becomes necessary to obtain a satisfactory signal-to-noise ratio (S/N) and results in an increase in the manufacturing cost.
4) Since the photomultiplier uses a complex multistage dynode, it is difficult for the photomultiplier to constitute a long one-dimensional detector (line sensor) of 17 inches in width which has a small pixel size of about 100 $\mu$m.

Japanese Unexamined Patent Publication No. 60(1985)-111568 (hereinafter referred to as Reference 2) has proposed an image reading method and apparatus to reduce the time for reading photostimulated luminescence light, make the apparatus compact in size, and reduce the cost. This apparatus is equipped with a linear light source (stimulating light source such as a fluorescent lamp, a cold cathode type fluorescent lamp, a light-emitting diode array, etc.) for irradiating stimulating light in a form of a line onto an image recording sheet having a stimulable phosphor layer; a line sensor (photoelectric converter) having a large number of solid photoelectric conversion elements arrayed along a line on the image recording sheet irradiated with linear light (stimulating light) by the linear light source, and scanning means for moving the linear light source and the line sensor relative to the sheet on the sheet surface in the vertical-scanning direction approximately perpendicular to the length-wise direction of the irradiated line. The photostimulated luminescence light, emitted from the sheet when scanned with the stimulating light, is sequencially read by the line sensor.

The Reference 2 discloses photoconductors as solid photoelectric conversion elements which constitute a line sensor used herein. Solid photoelectric conversion elements with bandgap E greater than the photon energy hc/$\lambda$ of stimulating light wavelength $\lambda$ (E>hc/$\lambda$), and solid photoelectric conversion elements with bandgap E smaller than hc/$\lambda$ (E<hc/$\lambda$), are both used. As examples of substance having E>hc/$\lambda$, there are ZnS, ZnSe, CdS, $TiO_2$, ZnO, etc. As examples of substances having E<hc/$\lambda$, there are $\alpha$-SiH, CdS(Cu), ZnS(Al), CdSe, PbO, etc. Note that the Greek letter "$\alpha$" in "$\alpha$-SiH" means "amorphous." Reference 2 also proposes use of a line sensor composed of silicon photodiodes.

The apparatus that uses a line sensor employing a plurlity of substances mentioned above, however, has problems as follows. That is, as photostimulated luminescence light is feeble, a photoconductor to be used is required to have extremely high dark resistance. However, the disclosed photoconductors are all low in dark resistance. Since reading is performed under a relatively large electric field, the dark current increases and it is fairly difficult to obtain a satisfactory S/N ratio. Particularly, when the bandgap E is small (E<hc/λ), the dark current resulting from thermal excitation is large and therefore it is extremely difficult to obtain a satisfactory S/N ratio.

In addition, in order to facilitate manufacture, a substance, which can be manufactured at a low substrate temperature and become, even in a large area, uniform in characteristic, is preferred. However, the aforementioned substance must be manufactured at a high substrate temperature of 100 ° C. or greater. Because each substance is composed basically of two kinds of elements, a film, which stabilizes the composition and is uniform, even in a large area, in characteristic, is made and therefore results in an increase the in the manufacturing cost.

Japanese Unexamined Patent Publication No. 60(1985)-236354 (hereinafter referred to as Reference 3) proposes an image reading method and apparatus, which is equipped with a stimulating light source for emitting a light spot, such as a laser beam, as stimulating light; and a stimulating-light scanning optical system for irradiating a sheet with the light spot in a horizontal-scanning direction and, at the same time, moving the stimulating light and a line sensor relatively to the sheet on the surface of the sheet in the vertical-scanning direction perpendicular to the horizontal-scanning direction. The photostimulated luminescence light, emitted from the sheet when scanned with the light spot, is sequencially read by the line sensor. The solid photoelectric conversion elements that constitute the line sensor used herein, however, are the same as those disclosed in Reference 2 and therefore have the same problems as mentioned above.

"Radiographic Process Utilizing a Photoconductive Solid-State Imager (772/Research disclosure, October, 1992/34264)" (hereinafter referred to as Reference 4) discloses a system, which is provided with a radiation-image converting panel (which is one form of the photoelectric conversion means) as a zero-dimensional photoelectric converter. The radiation-image converting panel is constructed of an image recording sheet having a stimulable phosphor layer which emits photostimulated luminescence light by an amount corresponding to energy stored when irradiated with stimulating light, and a photoconductive layer (interposed between two electrode layers) having a sensitivity to the photostimulated luminescence light. The image recorded on the radiation-image converting panel is read by scanning the panel two-dimensionally with light spot. It is disclosed that for the photoconductive layer constituting the panel, one having a high sensitivity to a photostimulated luminescence light wavelength of 500 nm and a low sensitivity to a stimulating light wavelength of 633 nm is satisfactory and amorphous selenium (α-Se) is preferred.

Amorphous selenium (α-Se) is highly sensitive to a wavelength of 500 nm or less (e.g., a blue light band of about 300 to 500 nm), is high in quantum efficiency relative to the photostimulated luminescence light near wavelength 400 nm, compared with a photomultiplier as a zero-dimensional photoelectric converter, and results in an efficient combination with the stimulable phosphor layer which is suitable for reading the photostimulated luminescence light emitted from the stimulable phosphor layer, compared with the photoconductive layers disclosed in the aforementioned References 1 to 3. In addition, α-Se is nearly insensitive to a wavelength of 600 nm or greater (e.g., a red light band of about 600 to 800 nm), is greater in ratio of a sensitivity to photostimulated luminescence light to a sensitivity to stimulating light, and is basically capable of detecting the photostimulated luminescence light emitted from the surface of the stimulable phosphor layer, without using a stimulating-light cut filter. Furthermore, α-Se is suitable for solidification (e.g., it is high in shock resistance) and can be thinned and increased in area, because a low-temperature deposition process can be performed on α-Se.

If the converting panel has approximately the same area as the sheet, however, the area of the photoconductive layer will become larger and therefore the manufacturing cost will be increased. Since the area of the photoconductive layer becomes larger, the generation of excessive dark current cannot be avoided, and since capacitance (output capacitance of the detector) also becomes greater, only an image with a poor S/N ratio can be obtained.

Japanese Patent Publication No. 7(1995)-76800 (hereinafter referred to as Reference 5), with the aforementioned Reference 4, discloses that the photostimulated luminescence light emitted from the stimulable phosphor layer is detected with the photoconductive layer of approximately the same area as an image detecting sheet. It also discloses that as an example of the photoconductive layer, one having a high sensitivity to photostimulated luminescence light wavelengths of 300 to 500 nm and a low sensitivity to stimulating light wavelengths of 600 to 800 nm is satisfactory, and particularly, a selenide is preferred. Furthermore, it discloses that the influence of dark current is reduced by dividing each of the electrodes provided on opposite sides of the photoconductive layer interposed therebetween, and detecting each current independently.

However, even if each electrode is divided, the area of the photoconductive layer will remain large and approximately the same area as the sheet, and the problem of increasing the manufacturing cost remains unsolved. In addition, since the total area of the electrodes remains large, the generation of excessive dark current cannot be avoided yet, and since capacitance is also great, the S/N ratio is not so improved.

Japanese Unexamined Patent Publication No. 58(1983)-121874 (hereinafter referred to as Reference 6), with the aforementioned References 4 and 5, discloses that the photostimulated luminescence light emitted from the stimulable phosphor layer is detected with the photoconductive layer of approximately the same area as an image detecting sheet and that a selenide is employed as the photoconductive layer. It also discloses that the influence of dark current is reduced by dividing each of the electrodes provided on opposite sides of the photoconductive layer interposed therebetween, and detecting each current independently. Furthermore, it discloses that in the case where the capacitance of the photoconductive layer is great and therefore additional noise will develop, each electrode is divided, for example, into parallel bands.

However, similarly to Reference 5, even if each electrode is divided, the area of the photoconductive layer will remain approximately the same area as the sheet and large, and the cost will be increased. In addition, because the total area of the electrodes remains large, the generation of excessive dark current cannot be avoided, and because capacitance is also great, the problem of a poor S/N ratio remains unsolved.

SUMMARY OF THE INVENTION

The present invention has been made in view of the aforementioned circumstances.

Accordingly, it is a first major object of the present invention to provide an image information reading method and an image information reading apparatus that are capable of obtaining an image with an improved S/N ratio, using a solid-state image detector.

A second major object of the invention is to provide, as photoelectric conversion means for detecting feeble photostimulated luminescence light emitted from an image recording sheet having a stimulable phosphor layer, a solid-state image detector which has great dark resistance and small output capacitance and is also high quantum efficiency relative to photostimulated luminescence light and a higher ratio of a sensitivity to blue light to a sensitivity to red light than a photomultiplier and capable of obtaining a satisfactory S/N ratio.

A third major object of the invention is to provide a solid-state image detector which is robust in shock resistance and is easy to thin and manufacture and low in cost.

To achieve the objects mentioned above, there is provided a method of reading image information, comprising the steps of:

using an image recording sheet which has a stimulable phosphor layer that emits photostimulated luminescence light of a quantity corresponding to energy stored when irradiated with stimulating light, and a solid-state image detector which has a photoconductive layer that exhibits conductibility when irradiated with the photostimulated luminescence light;

scanning the image recording sheet carrying the image information recorded thereon with the stimulating light;

guiding photostimulated luminescence light obtained by the scanning so that the photostimulated luminescence light is incident on the photoconductive layer;

detecting electric charge generated in the photoconductive layer by the incidence of the photostimulated luminescence light, under an electric field applied across the photoconductive layer; and obtaining an image signal which carries the image information by detecting the electric charge;

wherein the stimulable phosphor layer of the image recording sheet is stimulated with the stimulating light having a wavelength of 600 nm or greater (preferably, a red light band of 600 to 800 nm) and emits the photostimulated luminescence light having a wavelength of 500 nm or less (preferably, a blue light band of 300 to 500 nm);

the photoconductive layer of the solid-state image detector contains amorphous selenium as its main component and also has a smaller area than that of the image recording sheet; and the scanning is performed by moving the solid-state image detector relative to the image recording sheet on the surface thereof.

The expression "has a smaller area than that of the image recording sheet" is intended to mean that the length of each side of the solid-state image detector is shorter than or equal to that of each side of the image recording sheet in the directions corresponding to the aforementioned scanning and that at least one side is shorter than a side of the sheet. In the case of a long detector, for instance, the side in the longitudinal direction (horizontal-scanning direction) may be approximately the same as that of the sheet (which is preferable). However, the width is made narrower than the sheet width. In the case of a zero-dimensional detector approximately in the form of a square, each side is made smaller than the sheet.

It is preferable that in the image information reading method of the present invention, the length of at least one side of the solid-state image detector be one fifth or less of the length of one side of the image recording sheet. That is, it will be sufficient if the solid-state image detector has a slightly narrower width than the sheet length and enough size (lowest width) to detect photostimulated luminescence light.

It is also preferable that the thickness of the photoconductive layer of the solid-state image detector be 0.1 $\mu$m or greater in order to sufficiently absorb photostimulated luminescence light and make the signal level greater. A thicker photoconductive layer is preferred in order to render distributed capacitance smaller so that fixed noise is suppressed. However, if the film thickness is too large, the power-supply voltage for applying an electric field must be increased. Therefore, in consideration of power-supply voltage and in order to make fixed noise smaller, it is desirable to use a solid-state image detector in which the thickness of a photoconductive layer thereof is between 0.1 and 100 $\mu$m.

In a preferred form of the image information reading method of the present invention, the solid-state image detector comprises two solid-state image detectors disposed on opposite sides of the image recording sheet so that each detector can detect the photostimulated fluorescent light emitted from each surface of the image recording sheet.

In another preferred form of the image information reading method of the present invention, the solid-state image detector extends lengthwise in a horizontal-scanning direction scanned with the stimulating light, and comprises a plurality of solid-state image detectors disposed in parallel with the horizontal-scanning direction and along a vertical-scanning direction so that each detector can detect the photostimulated luminescence light emitted from the image recording sheet.

In the image information reading method of the present invention, it is desirable to dispose an optical filter between the photoconductive layer and the image recording sheet. For instance, the optical filter may be a stimulating light cut filter for cutting stimulating light and transmitting photostimulated luminescence light.

It is also desirable to apply an electric field under which avalanche amplification is obtained within the photoconductive layer. To effectively obtain avalanche amplification, it is desirable to employ a photoconductive layer having a thickness of 1 $\mu$m or greater, preferably 10 $\mu$m or greater. On the other hand, it is necessary to apply a high electric field across the photoconductive layer in order to obtain avalanche amplification, and if the film thickness is too large, power-supply voltage for applying an electric field must be increased. Therefore, in consideration of power-supply voltage and in order to effectively obtain avalanche amplification, it is desirable to use a solid-state image detector in which the thickness of a photoconductive layer thereof is within the range of 10 to 50 $\mu$m.

Note that if a photoconductive layer containing amorphous selenium ($\alpha$-Se) as its main component is used under an electric field in which avalanche amplification is obtained, it will be sensitive to fluctuations in the electric-field distribution (e.g., due to fluctuations in power-supply voltage) and therefore the image signal will fluctuate. For this reason, it is preferable to suppress the fluctuations in the image signal induced by the fluctuations in the electric-field distribution. The method of suppression may be, for example, a method of suppressing power-supply voltage fluctuations to the utmost for stabilization of voltage, or a method in which, in addition to voltage stabilization, power-supply voltage fluctuation data on fluctuations in output data with respect to power-supply voltage fluctuations is acquired and stored, power-supply voltage fluctuations during image reading are also monitored, and an image signal is corrected, e.g., by software, according to the power-supply voltage fluctuations during image reading.

To achieve the aforementioned objects of the present invention, there is also provided an apparatus for reading image information, comprising:

a light source for emitting stimulating light;

stimulating-light scanning means for scanning an image recording sheet with the stimulating light, the recording image sheet having a stimulable phosphor layer which emits photostimulated luminescence light of a quantity corresponding to stored energy when irradiated with the stimulating light;

a solid-state image detector having a photoconductive layer which exhibits conductibility when irradiated with the photostimulated luminescence light;

voltage application means for applying voltage across the photoconductive layer so that an electric field is generated; and image-signal acquisition means for obtaining an image signal which carries the image information, by scanning the image recording sheet which has the image information recorded thereon with the stimulating light, by guiding photostimulated luminescence light obtained by the scanning so that the photostimulated luminescence light is incident on the photoconductive layer, and by detecting electric charge generated in the photoconductive layer by the incidence of the photostimulated luminescence light under an electric field applied across the photoconductive layer;

wherein the stimulable phosphor layer of the image recording sheet is stimulated with the stimulating light having a wavelength of 600 nm or greater (preferably, within a red light band of 600 to 800 nm) and emits the photostimulated luminescence light having a wavelength of 500 nm or less (preferably, within a blue light band of 300 to 500 nm);

the photoconductive layer of the solid-state image detector contains amorphous selenium as the main component thereof and also has a smaller area than that of the image recording sheet; and the stimulating-light scanning means performs the scanning by relatively moving the solid-state image detector on a surface of the image recording sheet.

It is desirable that in the image information reading apparatus of the present invention, the length of at least one side of the solid-state image detector be one fifth or less of the length of one side of the image recording sheet.

It is also desirable that in the image information reading apparatus of the present invention, the thickness of the photoconductive layer of the solid-state image detector be between 0.1 and 100 $\mu$m.

In a preferred form of the image information reading apparatus, the solid-state image detector comprises two solid-state image detectors disposed on opposite sides of the image recording sheet, and the image-signal acquisition means detects electric charge generated when the photostimulated fluorescent light emitted from each surface of the image recording sheet is incident on the photoconductive layer of each of the two solid-state image detectors.

In another preferred form of the image information reading apparatus, the solid-state image detector extends lengthwise in a horizontal-scanning direction of the stimulating light, and comprises a plurality of solid-state image detectors disposed in parallel with the horizontal-scanning direction and along a vertical-scanning direction, and the image-signal acquisition means detects electric charge generated when the photostimulated fluorescent light emitted from the image recording sheet is incident on the photoconductive layer of each of the solid-state image detectors.

In the image information reading apparatus of the present invention, it is desirable to dispose an optical filter between the photoconductive layer and the image recording sheet. The optical filter is used for cutting the stimulating light and transmitting the photostimulated luminescence light.

In the image information reading apparatus of the present invention, it is also desirable that the voltage application means applies voltage across the photoconductive layer to generate an electric field under which avalanche amplification is obtained within the photoconductive layer. In this case it is desirable that the thickness of the photoconductive layer in the solid-state image detector is within the range of 10 to 50 $\mu$m.

Another preferred form of the image information reading apparatus is further equipped with suppression means for suppressing fluctuations in the image signal caused during acquisition of the image signal, the fluctuations resulting from fluctuations in the electric field being applied across the photoconductive layer.

Furthermore, in accordance with the present invention, there is provided a solid-state image detector comprising a photoconductive layer which exhibits conductibility when irradiated with photostimulated luminescence light emitted from an image recording sheet, wherein the photoconductive layer contains amorphous selenium as its main component and also has a smaller area than that of the image recording sheet. In a preferred form of the solid-state image detector, the length of at least one side of the solid-state image detector is one fifth or less of the length of one side of the image recording sheet.

In another preferred form of the solid-state image detector, the thickness of the photoconductive layer is within the range of 0.1 to 100 $\mu$m. In order to effectively obtain avalanche amplification, the thickness may be between 10 and 50 $\mu$m.

As described above, the image information reading method and apparatus of the present invention use an image recording sheet having a stimulable phosphor layer that emits photostimulated luminescence light of wavelength 500 nm or less when irradiated with stimulating light of wavelength 600 nm or greater, and also use a solid-state image detector having a photoconductive layer that contains amorphous selenium as its main component. The photoconductive layer of the solid-state image detector has a smaller area than that of the image recording sheet. The sheet is scanned with the stimulating light by relatively moving the solid-state image detector on the sheet surface. Amorphous selenium ($\alpha$-Se) has a high sensitivity to a blue light band of 500 nm or less, and the quantum efficiency with respect to photostimulated luminescence light in the vicinity of a wavelength of 400 nm may be, for example, as high as 60 to 70% (efficiency at which electric charge is generated is satisfactory). Therefore, combination of amorphous selenium ($\alpha$-Se) and the stimulable phosphor layer enables efficient reading of the photostimulated luminescence light in a blue light band, emitted from the stimulable phosphor layer. Besides, as the area of the photoconductive layer of the detector is smaller than that of the image recording sheet, there is no generation of excessive dark current and capacitance (output capacitance) can also be made smaller. Thus, a satisfactory S/N ratio can be obtained and a high-quality image can be obtained.

Furthermore, amorphous selenium ($\alpha$-Se) has hardly any sensitivity to light of wavelength 600 nm or greater and thus transmits the light. Therefore, a ratio of a sensitivity to photostimulated fluorescent light (in the vicinity of a wavelength of 400 nm) to a sensitivity to stimulating light (having wavelengths of 600 to 700 nm) is large. For example, when the film thickness of $\alpha$-Se is 10 $\mu$m with no avalanche amplification, a ratio of a sensitivity to blue light (of wavelength 470 nm) to a sensitivity to red light (of wavelength 680 nm) becomes about 3.5 digits. Note that if the film thickness of α-Se is reduced, the sensitivity to red light will decrease and the blue-to-red sensitivity ratio will further increase. If there is avalanche amplification, the blue-to-red sensitivity ratio will become even greater. Therefore, basically there is hardly any need to use a stimulating light cut filter. If light of wavelength 600 nm or greater which can stimulate a stimulable phosphor layer is used as stimulating light, and the stimulating light is directed onto the stimulable phosphor layer through the α-Se photoconductive layer, the photostimulated luminescence light emitted from the surface of the stimulable phosphor layer can be detected with the photoconductive layer and the picture quality will become satisfactory. In addition, the S/N ratio is satisfactory because α-Se is extremely high in dark resistance, compared with a silicon avalanche photodiode, etc.

If such an electric field with which avalanche amplification operation as charge-doubling operation is obtained is applied across the photoconductive layer, a quantity of electric charge that can be taken out may be exponentially increased. This enhances the S/N ratio of the image signal. Thus, a high-quality image can be obtained.

If fluctuations in the image signal resulting from fluctuations in the electric-field distribution are suppressed, a stable image signal and a higher-quality image can be obtained.

In addition, the solid-state image detector of the present invention is capable of reducing dark current and output capacitance, because it has a photoconductive layer containing amorphous selenium (α-Se) at its main component and makes the area of the photoconductive layer smaller than that of the image recording sheet.

In the case of employing a silicon avalanche photodiode, it is difficult to make a zero-dimensional detector or one-dimensional detector (line sensor) long, since silicon is a crystal and it is difficult to make it long. However, amorphous selenium (α-Se) does not get shocked so easily as a sensor employing glass and is suitable for solidification and can be thinned, because a low-temperature deposition process can be performed on α-Se. For example, it is easy to manufacture a solid-state image detector as short as 17 inches (about 25. 4 mm) in length.

BRIEF DESCRIPTION OF THE DRAWINGS

The present invention will be described in further detail with reference to the accompanying drawings wherein:

FIG. 1A is a perspective view of a radiation image reading apparatus replacing a photomultiplier with a solid-state image detector;

FIG. 1B is a sectional view showing the solid-state image detector and a current detecting circuit for the detector;

FIG. 3A is a perspective view of a radiation image reading apparatus replacing a long photomultiplier with a solid-state image detector;

FIG. 3B is a side view showing the solid-state image detector shown in FIG. 3A;

FIG. 8 is a block diagram showing a current detecting circuit for the one-dimensional solid-state image detector;

FIG. 12A is a schematic diagram showing a third variation of the one-dimensional solid-state image detector;

FIG. 12B is a schematic diagram showing the one-dimensional solid-state image detector provided with a slit;

FIG. 12C is a schematic diagram showing a combination of the one-dimensional solid-state image detector shown in FIG. 12A and the long solid-state image detector shown in FIG. 4;

FIG. 14A is a longitudinal sectional view showing a fifth variation of the one-dimensional solid-state image detector;

FIG. 14B is a sectional view showing the electrodes and pinholes shown in FIG. 14A; and FIG. 14C is a sectional view showing a sixth variation of the one-dimensional solid-state image detector.

DESCRIPTION OF THE PREFERRED EMBODIMENTS

Figure 2:
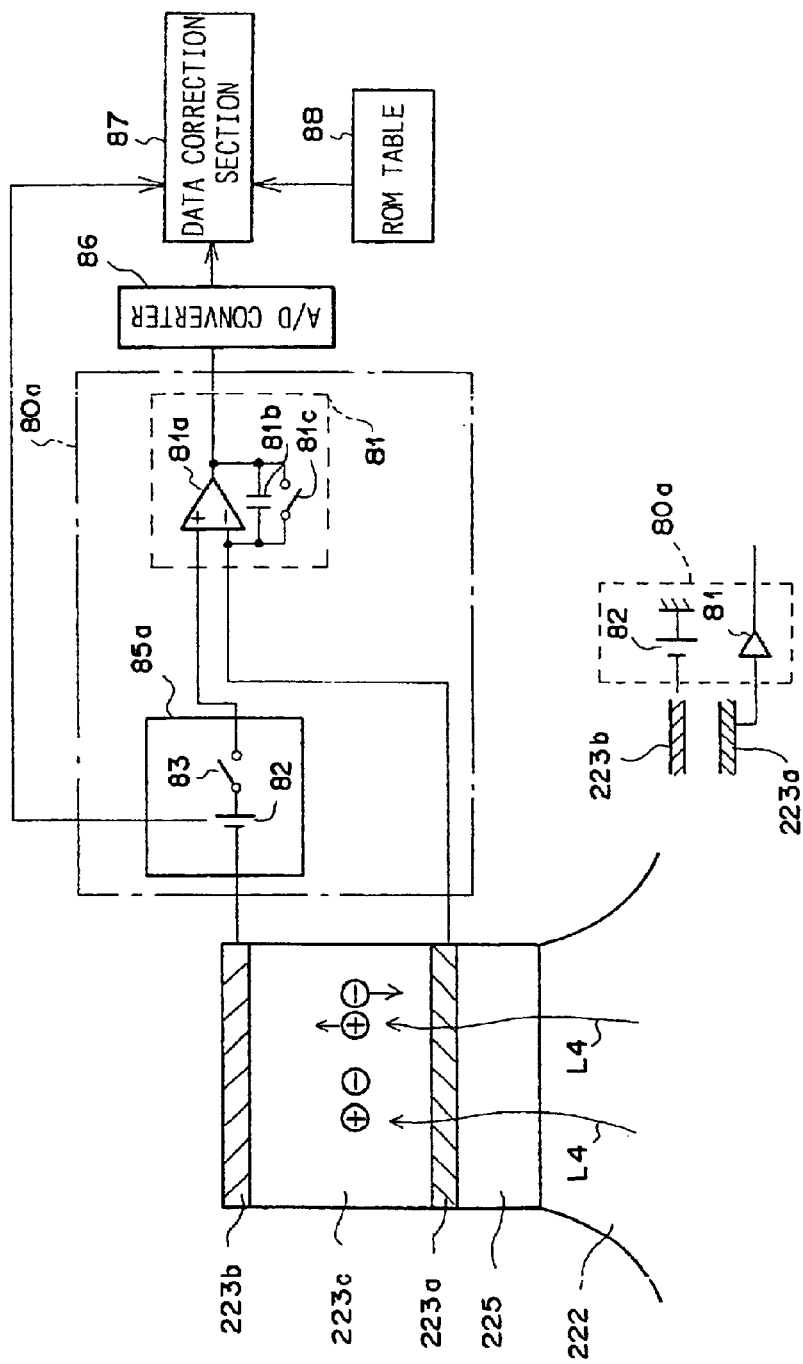
FIG. 2 is a block diagram showing circuitry for obtaining an electrical signal by reading out electric charge from the solid-state image detector.

Referring initially to FIG. 1, there is shown a radiation image reading apparatus, proposed in the aforementioned Reference 1, which utilizes a stimulable phosphor sheet as an image recording sheet. In the radiation image reading apparatus, a photomultiplier as photoelectric reading means for detecting photostimulated luminescence light emitted from the stimulable phosphor sheet is replaced with a solid-state detector according to the present invention.

The solid-state image detector 223 includes two flat electrodes 223a, 223b, and a photoconductive layer 223c, interposed between the flat electrodes 223a, 22b, which exhibits conductibility when irradiated with photostimulated luminescence light L4. The solid-state image detector 223 functions as a zero-dimensional sensor for detecting the photostimulated luminescence light L4 incident through an optical guide 232 and a stimulating light cut filter 225.

As the front flat electrode 223a on which the photostimulated luminescence light L4 is incident, it is preferable to use a known transparent conductive film, such as an indium tin oxide (ITO) film, etc., so that the electrode 223a can have a transmissibility to the photostimulated luminescence light L4 incident via the stimulating light cut filter 25. The rear flat electrode 223b, on the other hand, does not need to have transmissibility and may be, for example, an aluminum electrode.

The photoconductive layer 223c uses a substance that exhibits conductibility when irradiated not only with the photostimulated luminescence light L4 emitted from the stimulable phosphor layer 212 of the image recording sheet 211, but also with radiation (recording light L2), or instantaneous light emitted from the stimulable phosphor layer 212 by irradiation. For actual reading, a material for the photoconductive layer 223c may be a photoconductive substance that exhibits conductibility when irradiated with the photostimulated luminescence light L4 emitted from the stimulable phosphor layer 212. From the foregoing description, a photoconductive substance containing amorphous selenium ($\alpha$-Se) as its main component is suitable for being combined with the stimulable phosphor layer 212 which emits blue photostimulated luminescence light of wavelength 500 nm or less (e.g., wavelength in the vicinity of 400 nm).

The size (detection area) of this photoconductive layer 223c ($\alpha$-Se photoconductive film) is made sufficiently smaller than the size of the sheet 211 (e.g., 430 mm×430 mm, or 17 inches square). For instance, it is made 50 millimeters square or less. Thus, if the area of the photoconductive film is made smaller, the generation of excessive dark current can be avoided and load capacitance is also made smaller. As a result, a satisfactory S/N ratio can be obtained, compared with the detecting panels, described in the aforementioned References 4 to 6, where the stimulable phosphor layer and the photoconductive layer are opposed at approximately 1:1.

On the other hand, in order to increase signal level which can be taken out, it is preferable that the thickness of the photoconductive layer 223c be 1 $\mu$m or greater so that the photoconductive layer 223c can sufficiently absorb the photostimulated fluorescent light L4 and so that avalanche amplification can be obtained. In addition, to make distribution capacitance smaller so that fixed noise is suppressed, a thicker photoconductive layer is preferred. If the film thickness is too large, however, there is a disadvantage that power-supply voltage will become too large. Therefore, the film thickness is set, for example, within the range of 1 to 100 $\mu$m, preferably within the range of 10 to 50 $\mu$m taking power-supply voltage into consideration, so that a ratio of avalanche amplification effect and fixed noise becomes greater.

Note that the photoconductive layer 223c can have a transmissibility to red light (stimulating light), if it uses amorphous selenium ($\alpha$-Se). Therefore, stimulating light can also be directed onto the stimulable phosphor layer 212 through the photoconductive layer 223c.

As mentioned above, the stimulating light cut filter 225 is provided between the exit end face 222b of the optical guide 222 and the front electrode 223a on the entrance end face side of the solid-state image detector 223. If red stimulating light L3 having no image information is incident on the photoconductive layer 223c through the optical guide 222, offset current will develop by a small amount corresponding to electric charge developed by the stimulating light L3, because the photoconductive layer 223c also has a slight sensitivity to the red stimulating light L3. On the other hand, if the stimulating light cut filter 225 is inserted, it will absorb red light (having wavelength of 600 nm or greater) and allow only blue photostimulated luminescence light to be incident on the photoconductive layer 223c. Consequently, the stimulating light cut filter 225 will be able to suppress offset current. Note that because the photoconductive layer 223c has a low sensitivity to red stimulating light of wavelength 600 nm or greater, the stimulating light cut filter 225 can be thinned, compared with the conventional apparatus employing the photomultiplier.

FIG. 2 illustrates circuitry for obtaining an electrical signal by reading out electric charge from the solid-state image detector 223. As shown in the figure, the circuitry is equipped with a current detecting circuit 80a connected with the solid-state image detector 223, an A/D converter 86, a data correction section 87, and a ROM table 88. The data correction section 87 and the ROM table 88 are provided for suppressing signal fluctuations that result from fluctuations in the electric field applied across the photoconductive layer 223c, and function as suppression means of the present invention.

The current detecting circuit 80a has a current detecting amplifier 81, which is constructed of an operational amplifier 81a, an integrating capacitor 81b, and a switch 81c. The front electrode 223a of the solid-state image detector 223 is connected to the inverting input terminal (−) of the operational amplifier 81a.

The current detecting circuit 80a further has voltage application means 85a, which consists of a power supply 82 and a switch 83. The voltage application means 85a is used for applying a predetermined voltage between both electrodes 223a and 223b of the solid-stage image detector 223 to generate an electric field within the photoconductive layer 223c. The positive side of the power supply 82 is connected to the non-inverting terminal (+) of the operational amplifier 81a through the switch 83.

Note that the magnitude of the voltage across the power supply 82 is set so that gradient of the potential within the optical photoconductive layer 223c becomes $10^6$ V/cm or greater so that avalanche amplification operation is obtained within the photoconductive layer 223c.

The current detecting amplifier 81 functions as image signal acquisition means for obtaining an image signal which corresponds to the energy stored in the stimulable phosphor layer 212, by detecting current, i.e., outward flow of electric charge generated when the photostimulated fluorescent light L4 from the stimulable phosphor layer 212 is incident on the photoconductive layer 223c.

The A/D converter 86, data correction section 87, and ROM table 88, disposed behind the current detecting circuit 80a, are provided to correct for output data fluctuations which result from fluctuations in the voltage across the power supply 82. The photoconductive layer 223c with amorphous selenium (α-Se) as its main component will become sensitive to power-supply voltage fluctuations if it is used under the electric field in which avalanche amplification is obtained. For this reason, in addition to suppressing power-supply voltage fluctuations to the utmost for stabilization of voltage, power-supply voltage fluctuation data (i.e., the data on fluctuations in output data with respect to power-supply voltage fluctuations) is acquired and stored in the ROM table 88. Furthermore, in the data correction section 87, power-supply voltage fluctuations during image reading (more specifically, voltage between electrodes) are monitored, and according to the power-supply voltage fluctuations during image reading, output data is corrected, for example, by software.

The stimulable phosphor sheet 211 as an image recording sheet consists of a base 213 and the stimulable phosphor layer 212 laminated on the base 213, as shown in an enlarged view on the right side of FIG. 1A. The stimulable phosphor layer 212 emits the photostimulated fluorescent light L4 of an amount corresponding to stored energy, when irradiated with stimulating light.

The stimulable phosphor layer 212 may be of any type as far as it emits photostimulated fluorescent light having a wavelength of 500 nm or less (preferably, 400 to 450 nm) when stimulated with red stimulating light having a wavelength of 600 nm or greater. Stimulable phosphor sheets well known in prior art can be utilized. Note that although not shown, a protective layer and a sensitizing layer, for example, are provided in addition to the stimulable phosphor layer 212.

In reading out image information from the sheet 211, the switch 83 is first switched on. Consequently, voltage is applied between electrodes 223a and 223b of the detector 233, and an electric field is applied across the photoconductive layer 223c.

With the high electric field applied across the photoconductive layer 223c, the whole surface of the sheet 211 is scanned with the stimulating light L3 in the form of a beam. More specifically, the stimulable phosphor sheet 211 with radiation image recorded thereon, set at a predetermined position in a reading section 210, is conveyed in the direction of arrow Y by sheet conveying means 215, such as an endless belt, etc., which is driven by drive means (not shown). On the other hand, the light beam (stimulating light) L3 in a red light band, emitted from the laser beam source 216, is reflected and deflected by a rotating polygon mirror 218 being rotated at high speeds in the direction of an arrow by a motor 224. After being passed through a focusing lens 219 such as an fθ lens, the light beam L3 is incident on the sheet 211 through a mirror 220. The sheet 211 is scanned with the light beam L3 incident on the sheet 211 in the direction of arrow X approximately perpendicular to the vertical-scanning direction (i.e., the direction of arrow Y). Consequently, photostimulated luminescence light L of wavelength 400 mm or so (blue light band), quantity of which corresponds to the stored radiation image information, is emitted from a position on the sheet 211 irradiated with the light beam L3. The photostimulated luminescence light L4 is incident on the entrance end face 222a of the optical guide 222, and repeats total reflection while traveling through the optical guide 222 while. The photostimulated luminescence light L4 emitted from the exit end face 222b of the optical guide 222 is incident on the solid-state image detector 223. As described above, the laser beam source 216, rotating polygon mirror 218, focusing lens 219, drive means (not shown), etc., constitute stimulating-light scanning means 210.

Within the photoconductive layer 223c of the solid-state image detector 223, a pair of positive and negative charges of a quantity corresponding to the light quantity of the photostimulated luminescence light L4 are generated by the irradiation of the photostimulated luminescence light 4. The negative charge of the generated electric charge pair moves to the front electrode 223a and the positive charge moves to the rear electrode 223b.

Because a high electric field of $10^6$ V/cm or greater has been applied across the photoconductive layer 223c, avalanche amplification is obtained within the layer 223c and therefore the amount of a pair of positive and negative charges within the photoconductive layer 223c is greatly increased. Since the quantum efficiency of the fluorescent layer 212 is low and since the quantity of the photostimulated luminescence light L4 emitted from the fluorescent layer 212 is small, the quantity (number of signal photons) of the electric charge pair that is generated by direct irradiation of the photostimulated fluorescent light L4 is small. However, the avalanche amplification makes it possible to amplify the generated electric quantity (i.e., the charge doubling function is performed), and consequently, a sufficiently large signal is obtained and the S/N ratio can be enhanced.

As the operational amplifier 81a is provided between electrodes 223a and 223b, the current detecting amplifier 81 detects current produced by the aforementioned movement of positive and negative charges, thereby obtaining an image signal. That is, the current detecting amplifier 81 is capable of reading out the radiation image information. Because the thickness of the photoconductive layer 223c with amorphous selenium (α-Se) as its main component is set between 1 and 100 μm, as described above, the quantum efficiency with respect to blue photostimulated luminescence light of wavelength of about 400 nm, for example, can be made as great as 60 to 70% more than an avalanche photodiode employing a photomultiplier and silicon (Si). Furthermore, since such an electric field that avalanche amplification is obtained is applied across the photoconductive layer 223c to perform reading and since a correction for power-supply voltage fluctuations is made, the S/N ratio of the image signal can be considerably enhanced.

As the data correction section 87 and the ROM table 88 are provided to correct for the output data fluctuations which result from fluctuations in the voltage across the power supply 82, stable data without the influence of power-supply voltage fluctuations can be obtained and the S/N ratio of the image signal can be further enhanced.

As mentioned above, the photoconductive layer 223c contains amorphous selenium (α-Se) as its main component, and consequently, a ratio of a sensitivity to photostimulated fluorescent light in the vicinity of a wavelength of 400 nm and a sensitivity to stimulating light with wavelengths of about 600 to 700 nm can be sufficiently increased. For example, when the film thickness of α-Se is 10 μm with no avalanche amplification operation, a ratio of a sensitivity to blue light (of wavelength 470 nm) to a sensitivity to red light (of wavelength 680 nm) becomes about 3.5 digits. This value is an extremely great value, compared with the case where a photomultiplier is used as the photoelectric conversion means in which the blue-to-red sensitivity ratio is about 2 digits. Note that if the film thickness of α-Se is thinner, a sensitivity to red light will be reduced and therefore the blue-to-red sensitivity ratio will be further increased. It is a matter of course that if there is avalanche amplification, the blue-to-red sensitivity ratio will become even greater. Because silicon (Si) has a high sensitivity to red light and a low sensitivity to blue light, silicon is unsuitable for the use (i.e., shows poor matching) in a combination with photostimulated fluorescent light which primarily emits blue light.

The solid-state image detector 223 can be reduced in size and weight, compared with conventional photomultipliers. Therefore, the aforementioned entire apparatus replacing the conventional photomultiplier with the solid-state image detector 223 can also be reduced in size and weight. In addition, the photoconductive layer 223c with amorphous selenium (α-Se) as its main component can be easily manufactured because it can be manufactured by lamination based on low-temperature deposition. Furthermore, the photoconductive layer 223c is not easily affected by shock, because unlike a photomultiplier, it is not made of glass.

Now, a radiation image reading apparatus replacing a long photomultiplier (which is photoelectric reading means for detecting the photostimulated luminescence light L4 emitted from the stimulable phosphor sheet 211) with a solid-state image detector will be described in detail with reference to FIGS. 3 through 5.

In the radiation image reading apparatus illustrated in FIG. 3, a stimulable phosphor sheet 211 is disposed on two endless belts 215a and 215b which are rotated by a motor (not shown). Above the sheet 211, there are a disposed laser beam source 216 for emitting laser beam L3 which stimulates the sheet 211; a rotating polygon mirror 218 rotated by a motor (not shown) for reflecting and deflecting the laser beam L3; and a scanning lens (fθ lens) 219 for converging the laser beam L3, reflected and deflected by the rotating polygon mirror 219, at the sheet 211 and scanning the sheet 211 with the laser beam L3 at regular speed. The sheet 211 is scanned in the direction of arrow X (horizontal-scanning direction) with the laser beam L3. The sheet 211 is also conveyed in the direction of arrow Y by the endless belts 215a, 215b, and consequently, the whole surface of the sheet 211 is scanned with the laser beam L3.

Above the surface of the sheet 211 scanned with the laser beam L3 (i.e., above the surface on the side where stimulating light is incident), there is a disposed long solid-state image detector 223 for detecting photostimulated luminescence light L4, emitted from the surface of the sheet 211 when stimulated with the laser beam L3, which corresponds to the radiation image information recorded on the sheet 211. With this disposition, as with the apparatus shown in FIG. 1, an electric charge of a quantity corresponding to the light quantity of the photostimulated luminescence light L4 is produced within the photoconductive layer 223c of the solid-state image detector 223, and the electric charge is detected by a current detecting circuit 80a.

Figure 4A:
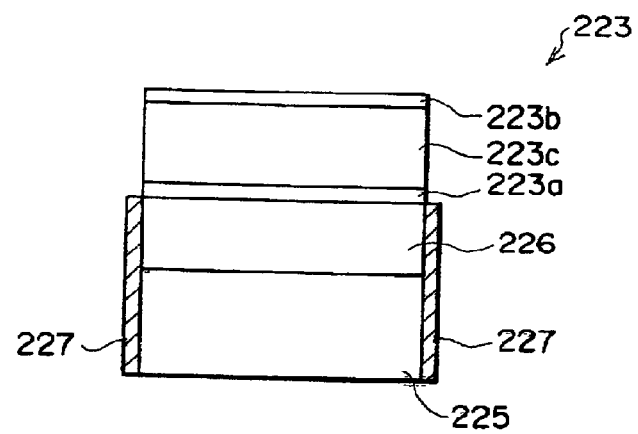
FIGS. 4A and 4B are sectional views showing a long solid-state image detector.
Figure 4B:
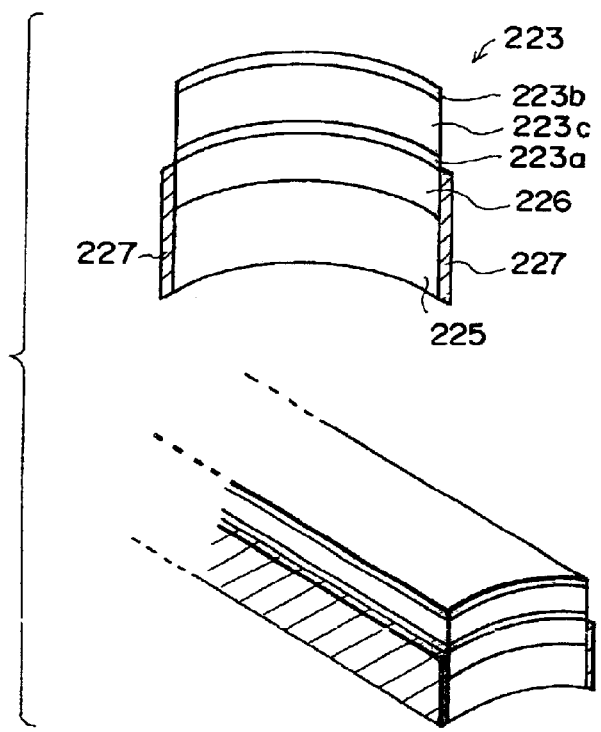

The radiation image reading apparatus of the aforementioned configuration is capable of using a long solid-state image detector 223 disposed on a glass substrate 226, such as the one shown in FIG. 4. This solid-state image detector 223 has a long light detecting surface extending in the horizontal-scanning direction (direction of arrow X) of the laser beam L3 used for scanning the surface of the sheet 211. The solid-state image detector 223 consists of two long and flat electrodes 223a, 223b, and a photoconductive layer 223c, interposed between the flat electrodes 223a and 223b, which exhibits conductibility when irradiated with the photostimulated luminescence light L4 incident through the glass substrate 226. The solid-state image detector 223 functions as a zero-dimensional sensor, though it is long. The length (in the horizontal-scanning direction) of the photoconductive layer 223c (α-Se photoconductive film) is made approximately the same length as the sheet 211, while the width is made, for example, 50 mm or less so that it becomes sufficiently smaller compared with the width of the sheet 211 (e.g., 430 mm×430 mm, or 17 inches square). If the area of the photoconductive film is made smaller, as in the embodiment shown in FIG. 1, the generation of excessive dark current can be avoided and load capacitance can be made smaller. Consequently, a satisfactory S/N ratio can be obtained compared with the case where the stimulable phosphor layer 212 and the photoconductive layer 223 are opposed at approximately 1:1. In addition, a stimulating light cut filter 225 is provided on the entrance side of the glass substrate 225 (opposite side from the front flat electrode 223a) on which the photostimulated luminescence light L4 is incident. Furthermore, a light intercepting member 227 is provided on the side faces of the stimulating light cut filter 225 and the glass substrate 226. As described above, the photoconductive layer 223c has a low sensitivity to red stimulating light of wavelength 600 nm or greater, so that the stimulating light cut filter 225 can be made thinner than that employed in a photomultiplier. Used for the flat electrode 223a on the side where the photostimulated luminescence light L4 is incident is a known transparent conductive film, such as an ITO film, so that it can have a transmissibility to the photostimulated luminescence light L incident via the stimulating light cut filter 225 and the glass substrate 226. As with the case shown in FIG. 2, a photoconductive material which contains as its main component α-Se and which is within the range of 1 to 100 μm (preferably, 10 to 50 μm) is employed for the photoconductive layer 223c. In addition, the potential gradient within the photoconductive layer 223c is set to $10^6$ v/cm or greater so that avalanche amplification operation is obtained within the photoconductive layer 223c. Note that as shown in FIG. 4B, the solid-state image detector 223 as a whole may be manufactured into a cylindrical shape.

The long solid-state image detector 223 can be reduced in size and weight, compared with conventional long photomultipliers. Therefore, the aforementioned entire apparatus replacing the conventional long photomultiplier with the long solid-state image detector 223 shown in FIG. 4 can also be reduced in size and weight. Sensors employing a long photomultiplier or silicon avalanche photodiode are expensive, whereas the long solid-state image detector 223 is easy to manufacture. For example, even if it is a one-dimensional sensor 17 inches (about 25.4 mm) in length, the manufacturing cost can be reduced.

The thickness of the photoconductive layer 223c is set within the range of 1 to 100 μm, and such an electric field that avalanche amplification is obtained is applied across the photoconductive layer 223c. In this condition, reading is performed, whereby the S/N ratio of the image signal is enhanced and the blue-to-red sensitivity ratio is increased. Thus, similar effects as the aforementioned first embodiment are also obtainable.

Figure 5A:
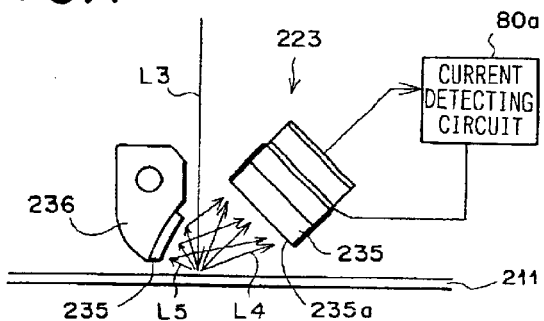
FIG. 5A is a schematic diagram showing a combination of the solid-state image detector shown in FIG. 3 and a focusing mirror.

Note that in the case of performing image reading using the solid-state image detector 223 shown in FIG. 4, the present invention is not limited to the disposition shown in FIG. 3. For instance, as shown in FIG. 5A, a focusing mirror 235 in the form of a cylinder may be provided so that photostimulated luminescence light L5 other than the photostimulated luminescence light L4 (which is emitted from the sheet 211 and directly incident on the solid-state image detector 223) can be efficiently guided to the solid-state image detector 223. In this case, the focusing mirror 235 is attached to a mirror mount 236 extending in the horizontal-scanning direction of the laser beam L, as with the focusing mirror 235. The focusing mirror 235 is also disposed near an end face 235a and in opposition to the incidence surface 235a of the stimulating light cut filter 235, so that the photostimulated luminescence light L5 can be efficiently guided to the solid-state image detector 223.

Figure 5B:
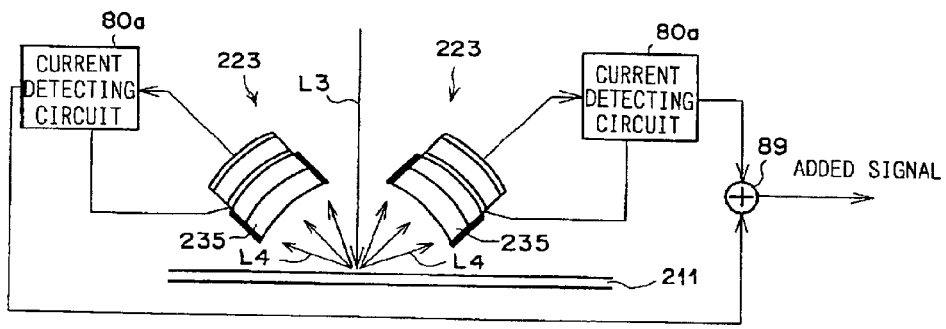
FIG. 5B is a schematic diagram showing a combination of two solid-state image detectors.

As shown in FIG. 5B, the solid-state image detector 223 shown in FIG. 4 can also be disposed at the position, shown in FIG. 5A, where the focusing mirror 235 is disposed. In this case, the electric charges generated at the two solid-state image detectors 223 are detected by two separate current detecting circuits 80a, and the two signals are added by adding means 89. In this manner, the detection efficiency can be increased and the S/N ratio enhanced.

Figure 5C:
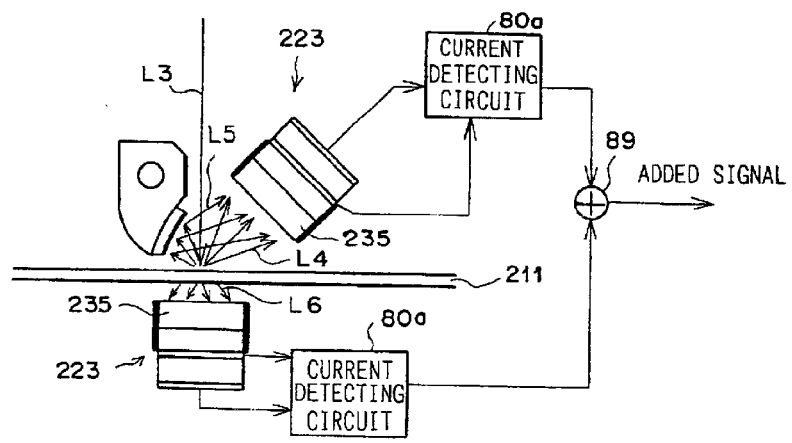
FIG. 5C is a schematic diagram showing a combination of the solid-state image detector shown in FIG. 3, the solid-state image detector shown in FIG. 4, and the focusing mirror shown in FIG. 5A.

As shown in FIG. 5C, the solid-state image detector 223 shown in FIG. 4 may be disposed near the lower surface of the sheet 211 in addition to the configuration shown in FIG. 5A. In this case, the electric charges generated at the two solid-state image detectors 223 are detected by two separate current detecting circuits 80a, and the two signals are added by adding means 89. This structure is often called a double reading structure. Because the photostimulated luminescence light L6 emitted from the lower surface of the sheet 211 can also be detected, the S/N ratio is enhanced.

Figure 6:
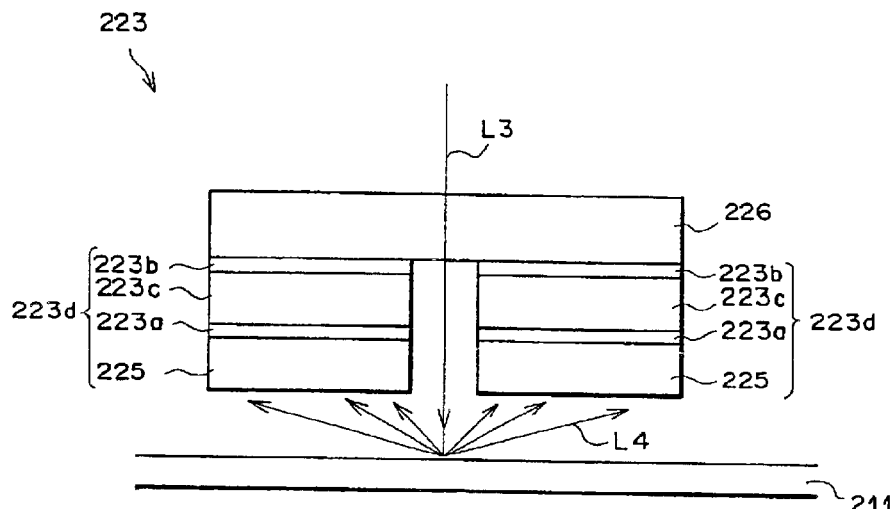
FIG. 6 is a sectional view showing a variation of the long solid-state image detector.

Furthermore, the long solid-state image detector 223 can be constructed to have two solid-state image detecting portions 223d, as shown in FIG. 6. Each of the two solid-state image detecting portions 223d consists of two long and flat electrodes 223b and 223b, and a photoconductive layer sandwiched between the electrodes 223a and 223b. The two solid-state image detecting portions 223d are disposed on the right and left sides of the lower surface of a long glass substrate 226 so that the upper flat electrodes 223b and 223b are placed on the side of the glass substrate 226. Each solid-state image detecting portion 223d is basically the same as the solid-state image detector shown in FIG. 4 and therefore stimulating light cut filters 225 are provided on the flat electrodes 223a on which photostimulated luminescence light L4 is incident. In the case of performing image reading using the solid image detector 223 shown in FIG. 6, the laser beam (stimulating light) L3 is incident on the sheet 211 through a portion of the glass substrate 226 on which the two solid-state image detecting portions 223d are not provided, as shown in the same figure. In this way, the sheet 211 is scanned with the laser beam L3. The photostimulated luminescence light L4, emitted from the surface of the sheet 211 when stimulated with the laser beam L3, is detected by the two solid-state image detecting sections 223d disposed on opposite sides. In a similar manner as that shown in FIG. 5B, the electric charges generated at the two solid-state image detecting sections 223d are detected by two separate current detecting circuits 80a, and two signals are added. In this manner, the detection efficiency can be enhanced. Note that the solid-state image detecting portions 223d can be moved closer to the sheet 211 than that shown in FIG. 5B. Thus, the detection efficiency and the S/N ratio can further be enhanced.

FIGS. 7 to 11 illustrate the case where the line sensor (photoelectric reading means) proposed in the aforementioned Reference 2, for detecting photostimulated luminescence light L4 emitted from the stimulable phosphor sheet 211, is replaced with a line solid-state image detector. Note that in FIGS. 10 and 11, the depth direction is the horizontal-scanning direction (longitudinal direction of the detector).

Figure 7A:
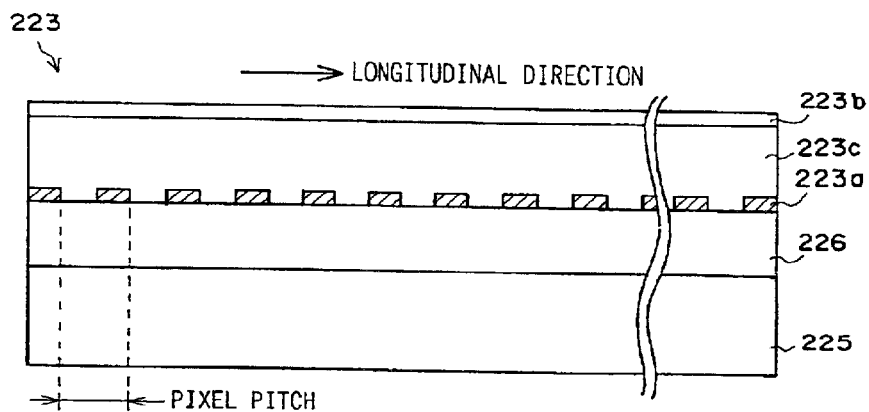
FIG. 7A is a longitudinal sectional view showing a one-dimensional solid-state image detector.
Figure 7B:
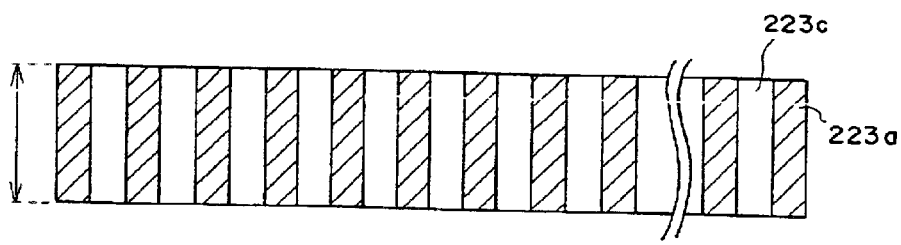
FIG. 7B is a sectional view of the electrodes shown in FIG. 7A.
Figure 9A:
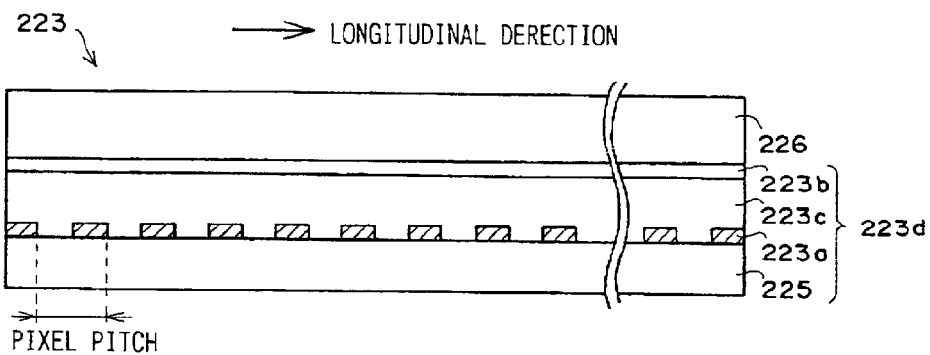
FIG. 9A is a longitudinal sectional view showing a variation of the one-dimensional solid-state image detector.
Figure 9B:
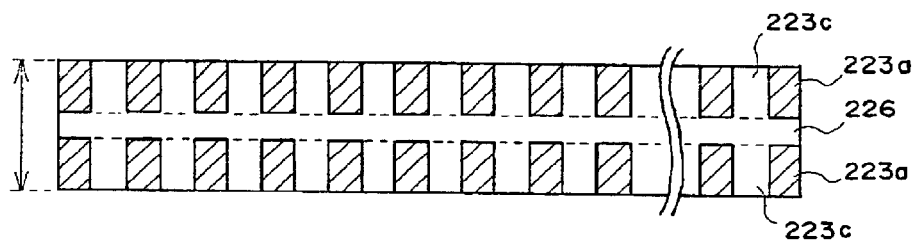
FIG. 9B is a sectional view of the electrodes shown in FIG. 9A.

The solid-state image detector 223 shown in FIG. 7 is constructed so that the flat electrode 223a in the long solid-state image detector 223 shown in FIG. 3 is divided longitudinally at intervals of a pixel pitch and with a predetermined width within the pixel pitch. The solid-state image detector 223 shown in FIG. 8 is constructed so that the flat electrode 223a in the long solid-state image detector 223 shown in FIG. 6 is divided at intervals of a pixel pitch in the longitudinal direction. The electrode 223b remains long and flat. The width as with the aforementioned case is made, for example, 50 mm or less so that it becomes sufficiently smaller than the width of the sheet 211 (e.g., 430 mm×430 mm). In this manner, the solid-state image detectors shown in FIGS. 7 and 8 can be used as one-dimensional sensors (line sensors) where a large number of small solid-state image detecting sections 223d are arrayed in line form. As shown in FIG. 8, the current detecting circuit 80 differs from the current detecting circuit 80a shown in the first embodiment, in that a great number of current detecting amplifiers 81 are provided and that the electrodes 223a of the solid-image image detecting sections 223d are individually and independently connected to the current detecting amplifiers 81.

In the case of performing image reading using solid-state image detector (one-dimensional sensor) 223 shown in FIG. 7 or 8, the solid-state image detector 223 is disposed in the same manner as the long solid-state image detector 223 shown in FIG. 3A. Employed as the stimulating light source is, on the other hand, a linear light source 293 such as a fluorescent lamp, a cold cathode type fluorescent lamp, an organic EL array or a light-emitting diode array, which directs stimulating light L3 in a line form onto the sheet 211 in the horizontal-scanning direction. Instead, light spot may be moved in the horizontal-scanning direction, as in FIG. 1A. The light source and the solid-image detector (one-dimensional sensor) 223 are moved relative to the sheet 211 in the vertical-scanning direction Y approximately perpendicular to the horizontal-scanning direction X. In this way, the image recorded on the sheet 211 is read out. The electrodes 223a of the solid-state image detecting sections 223d each correspond to 1 pixel are respectively connected to the current detecting amplifiers 81 so that simultaneous reading can be performed in the horizontal-scanning direction which is the array direction of the electrodes 223a. Thus, the time to read the photostimulated luminescence light L4 can be shortened.

Figure 10A:
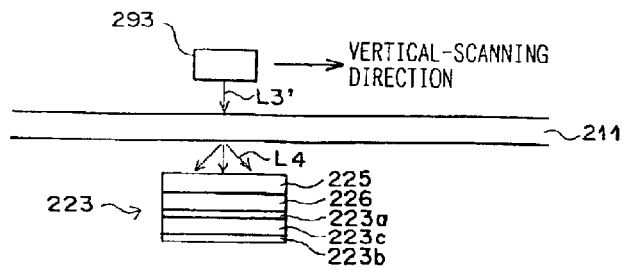
FIG. 10A is a schematic diagram showing a linear light source disposed above the image recording sheet and the one-dimensional solid-state image detector disposed under the sheet.

As illustrated in FIG. 10A, if the linear light source 293 such as an organic EL array or a light-emitting diode array is disposed on both the upper surface side of the sheet 211 and the line solid-state image detector on the lower surface side, for example, the apparatus can be extremely thinned. Sensors employing a silicon avalanche photodiode are expensive, whereas the line solid-state image detector 223 is easy to manufacture. For example, even if it is a one-dimensional sensor of 17 inches (about 25.4 mm) in length, the manufacturing cost can be reduced.

Figure 10B:
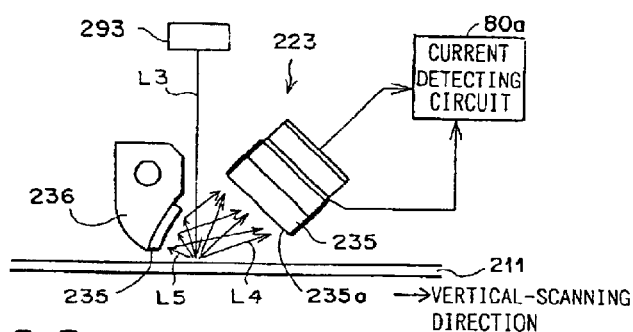
FIG. 10B is a schematic diagram showing the linear light source, focusing mirror, and one-dimensional solid-state image detector disposed above the image recording sheet.
Figure 10C:
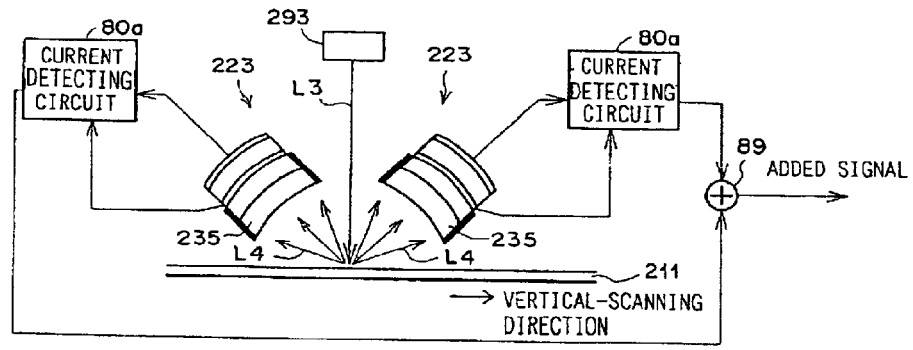
FIG. 10C is a schematic diagram showing the linear light source and two one-dimensional solid-state image detectors disposed above the image recording sheet.
Figure 10D:
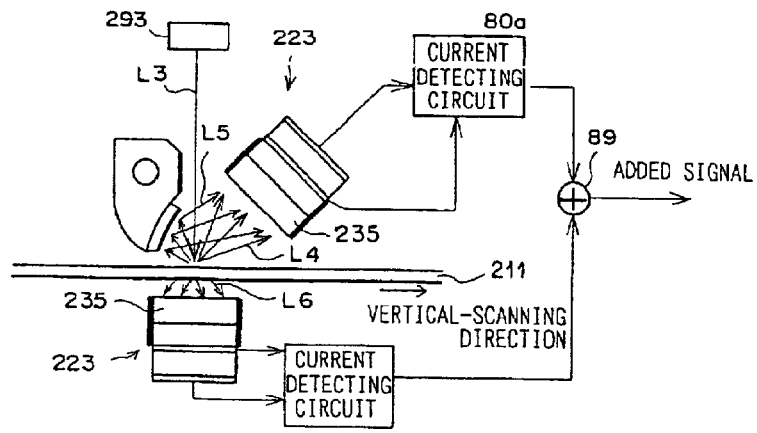
FIG. 10D is a schematic diagram showing the linear light source, focusing mirror, and one-dimensional solid-state image detector disposed above the image recording sheet, and a one-dimensional solid-state image detector disposed under the sheet.

A configuration similar to that of the long solid-state image detector 223 and similar read operation, shown in FIG. 5, can also be adopted as shown FIGS. 10B to D, though the size of the apparatus would become larger in that case than that of FIG. 10A. In the configuration shown in FIG. 10B, detection is performed on the upper surface side using a focusing mirror 235. Compared with the case of FIG. 10A, the image signal is larger and the S/N ratio is more satisfactory. In the configuration shown in FIGS. 10C and D, electric charges produced at two corresponding solid-state image detecting sections are detected by two separate current detecting amplifiers 81 and the two signals are added. Thus, the S/N ratio is further enhanced.

Figure 11A:
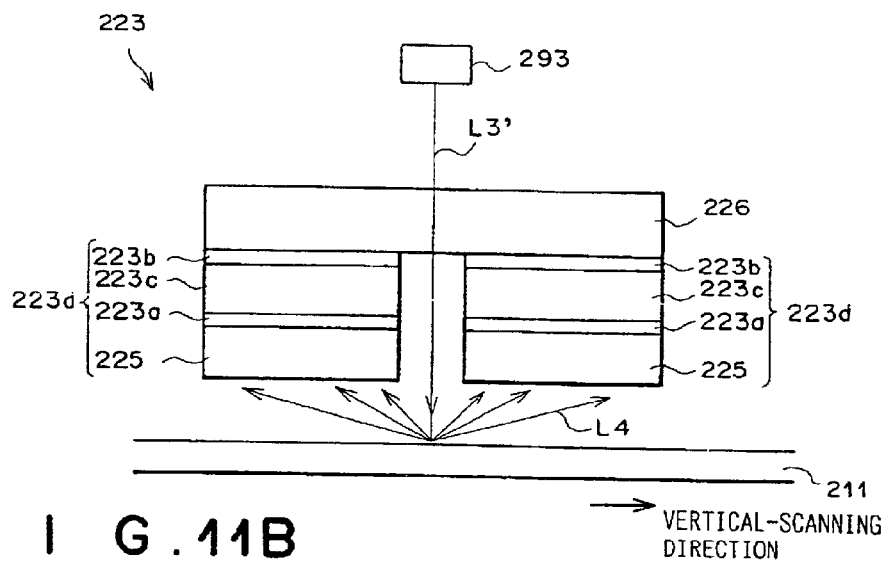
FIG. 11A is a schematic diagram showing a second variation of the one-dimensional solid-state image detector.
Figure 11B:
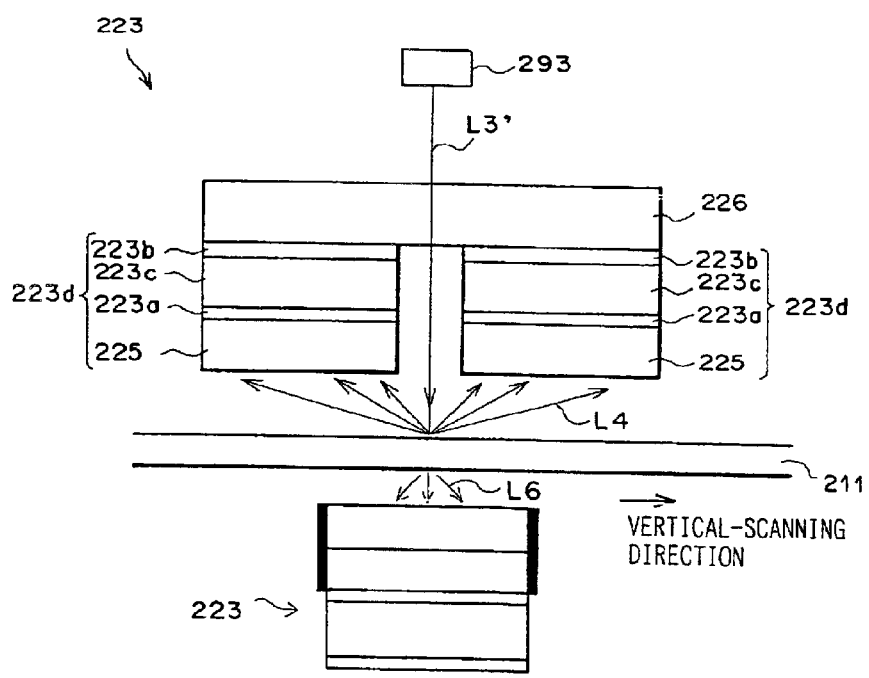
FIG. 11B is a schematic diagram showing a combination of the one-dimensional solid-state image detector shown in FIG. 11A and the one-dimensional solid-state image detector shown in FIG. 7.

In the case of employing the solid-state image detector 223 shown in FIG. 8, the detector 223 can be disposed only on the upper surface side of the sheet 211 as shown in FIG. 11A. Besides, the solid-state image detector 223 (shown in FIG. 7) can also be disposed on the lower surface side of the sheet 211 as shown in FIG. 11B. When the solid-state image detector 223 shown in FIG. 7 is disposed on the lower surface side, three corresponding signal components can be added, making the S/N ratio further enhanced. Note that such a configuration is also applicable in the case of employing the long (zero-dimensional) solid-state image detector 223 shown in FIG. 6.

Now, a description will be made for the case where, in the long (zero-dimensional) image detector and the line (one-dimensional) image detector, the thickness of the photoconductive layer 223c is reduced (e.g., within the range of 0.1 to 1 μm) and the stimulating light L3 is directed onto the sheet 211 through the photoconductive layer 223c. In this case it is difficult to apply such an electric field that avalanche amplification is obtained across the photoconductive layer 223c. As the photoconductive layer 223c is thin, on the other hand, the ratio of a sensitivity to blue light to a sensitivity to red light can be increased.

FIG. 12 illustrates solid-state image detectors (zero-dimensional detectors) 223 that are long in the width direction. The detector 223 shown in FIG. 12A is laminated on a glass substrate 226 so that a long and flat electrode 223a is placed on the side of the glass substrate 226, and has no stimulating light cut filter. In the detector 223 shown in FIG. 12B, in addition to the detector 223 shown in FIG. 12A, a stimulating light cut filter 225 is laminated on a long and flat electrode 223b, the filter 225 being provided with a long and narrow slit through which line stimulating light is passed. Note that because the photoconductive layer 223c has a low sensitivity to red stimulating light of wavelength 600 nm or greater, the stimulating light cut filter 225 can be thin.

The electrodes 223a and 223b both transmit the stimulating light L3. The electrode 223b facing the sheet 211 transmits the photostimulated luminescence light L4 emitted from the sheet 211.

The detector 223 shown in FIG. 12A can be disposed closer to the sheet 211 than that shown in FIG. 6, and the sheet 211 can be scanned through the photoconductive layer 223c with the stimulating light L3. Thus, the detection efficiency and the sharpness can be further enhanced, compared with the embodiment shown in FIG. 6. However, the detector 223 shown in FIG. 12A undergoes the influence of offset current caused by the stimulating light L3, since it does not have the stimulating light cut filter 225. In the detector 223 shown in FIG. 12B, there is provided a slit, and a portion of the photostimulated luminescence light L4 corresponding to the slit cannot be detected. This results in a slight reduction in the detection efficiency. However, the detector 223 shown in FIG. 12B is capable of suppressing offset current caused by the stimulating light L3, because it is provided with the stimulating light cut filter 225.

As shown in FIG. 12C, the detector 223 shown in FIG. 4 may be disposed on the lower surface side of the sheet 211 in addition to the detector shown in FIG. 12A or B. In this case, reading is performed on both surfaces and the outputs from both detectors are added. Because the photoconductive layer 223c is sufficiently thick, the detector 223 disposed on the lower surface side of the sheet 211 is used while applying an electric field that induces avalanche amplification across the photoconductive layer 223c.

Figure 13A:
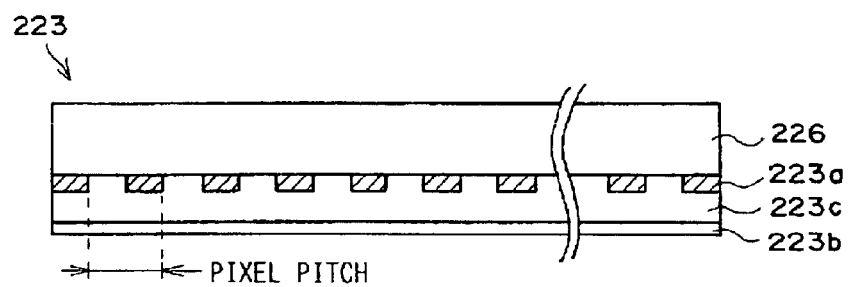
FIG. 13A is a longitudinal sectional view showing a fourth variation of the one-dimensional solid-state image detector.
Figure 13B:
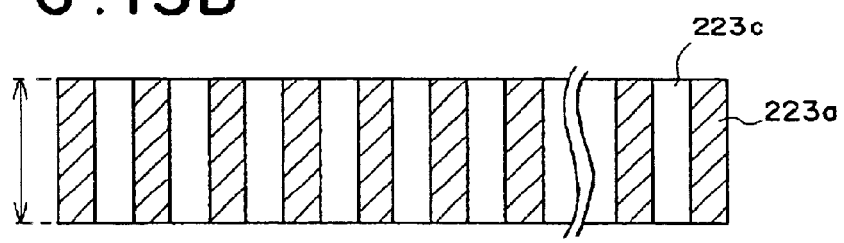
FIG. 13B is a sectional view of the electrodes shown in FIG. 13A.

FIGS. 13 and 14 illustrate the case where the solid-state image detectors shown in FIGS. 12A and B are formed as line sensors. The solid-state image detector 223 shown in FIG. 13 is constructed so that, in the long solid-state image detector 223 shown in FIG. 12A, the flat electrode 223a is longitudinally divided at intervals of a pixel pitch and with a predetermined width within the pixel pitch (i.e., so that each of the divided electrodes corresponds to 1 pixel). The solid-state image detector 223 shown in FIG. 14, on the other hand, is constructed so that, in the long solid-state image detector 223 shown in FIG. 12B, the flat electrode 223a is divided at intervals of a pixel pitch in the longitudinal direction. In the detector 223 shown in FIG. 14, the stimulating light cut filter 225 may be a type where pinholes for passing line stimulating light therethrough are arrayed at intervals of a pixel pitch in the horizontal-scanning direction, as shown in FIG. 14B. As shown in FIG. 14C, it may be a type in which a long and narrow slit is provided in the horizontal-scanning direction. The line sensors shown in FIGS. 13 and 14 are capable of obtaining similar effects as those obtained by the detector shown in FIG. 12.

While the present invention has been described with reference to the preferred embodiments thereof, the invention is not to be limited to the details given herein, but may be modified within the scope of the invention hereinafter claimed.

What is claimed is:

1. A method of reading image information, comprising the steps of:

using an image recording sheet which has a stimulable phosphor layer that emits photostimulated luminescence light of a quantity corresponding to energy stored when irradiated with stimulating light, and a solid-state image detector which has a photoconductive layer that exhibits conductibility when irradiated with said photostimulated luminescence light;

scanning said image recording sheet carrying said image information recorded thereon with said stimulating light;

guiding photostimulated luminescence light obtained by said scanning so that said photostimulated luminescence light is incident on said photoconductive layer, detecting electric charge generated in said photoconductive layer by the incidence of said photostimulated luminescence light, under an electric field applied across said photoconductive layer; and obtaining an image signal which carries said image information by detecting said electric charge;

wherein the stimulable phosphor layer of said image recording sheet is simulated with said stimulating light having a wavelength of 600 nm or greater and emits said photostimulated luminescence light having a wavelength of 500 nm or less;

the photoconductive layer of said solid-state image detector contains amorphous selenium as its main component and also has a smaller area than that of said image recording sheet; and said scanning is performed by moving said solid-state image detector relative to said image recording sheet on the surface thereof, wherein an electric field under which avalanche amplification is obtained within said photoconductive layer is applied.

2. The method as set forth in claim 1, wherein fluctuations in said image signal during acquisition of said image signal are suppressed, said fluctuations resulting from fluctuations in said electric field being applied across said photoconductive layer.

3. The method of claim 2, wherein the fluctuations are suppressed by referring to a corrective memory table.

4. The method of claim 1, wherein the electric field has a gradient of at least $10^6$ V/cm.

5. A method of reading image information, comprising the steps of:
- using an image recording sheet which has a stimulable phosphor layer that emits photostimulated luminescence light of a quantity corresponding to energy stored when irradiated with stimulating light, and a solid-state image detector which has a photoconductive layer that exhibits conductibility when irradiated with said photostimulated luminescence light;
- scanning said image recording sheet carrying said image information recorded thereon with said stimulating light;
- guiding photostimulated luminescence light obtained by said scanning so that said photostimulated luminescence light is incident on said photoconductive layer;
- detecting electric charge generated in said photoconductive layer by the incidence of said photostimulated luminescence light, under an electric field applied across said photoconductive layer; and
- obtaining an image signal which carries said image information by detecting said electric charge;
- wherein the stimulable phosphor layer of said image recording sheet is simulated with said stimulating light having a wavelength of 600 nm or greater and emits said photostimulated luminescence light having a wavelength of 500 nm or less;
- the photoconductive layer of said solid-state image detector contains amorphous selenium as its main component and also has a smaller area than that of said image recording sheet; and
- said scanning is performed by moving said solid-state image detector relative to said image recording sheet on the surface thereof,
- wherein the length of at least one side of said solid-state image detector is one fifth or less of the length of one side of said image recording sheet,
- wherein an electric field under which avalanche amplification is obtained within said photoconductive layer is applied.

6. A method of reading image information, comprising the steps of:
- using an image recording sheet which has a stimulable phosphor layer that emits photostimulated luminescence light of a quantity corresponding to energy stored when irradiated with stimulating light, and a solid-state image detector which has a photoconductive layer that exhibits conductibility when irradiated with said photostimulated luminescence light;
- scanning said image recording sheet carrying said image information recorded thereon with said stimulating light;
- guiding photostimulated luminescence light obtained by said scanning so that said photostimulated luminescence light is incident on said photoconductive layer;
- detecting electric charge generated in said photoconductive layer by the incidence of said photostimulated luminescence light, under an electric field applied across said photoconductive layer; and
- obtaining an image signal which carries said image information by detecting said electric charge;
- wherein the stimulable phosohor layer of said image recording sheet is simulated with said stimulating light having a wavelength of 600 nm or greater and emits said photostimulated luminescence light having a wavelength of 500 nm or less;
- the photoconductive layer of said solid-state image detector contains amorphous selenium as its main component and also has a smaller area than that of said image recording sheet; and
- said scanning is performed by moving said solid-state image detector relative to said image recording sheet on the surface thereof,
- wherein the thickness of said photoconductive layer of said solid-state image detector is within the range of 0.1 to 100 $\mu$m,
- wherein an electric field under which avalanche amplification is obtained within said photoconductive layer is applied.

7. An apparatus for reaching image information, comprising:
- a light source for emitting stimulating light;
- stimulating-light scanning means for scanning an image recording sheet with said stimulating light, said recording image sheet have a stimulable phosphor layer which emits photostimulated luminescence light of a quantity corresponding to stored energy when irradiated with said stimulating light;
- a solid-state image detector having a photoconductive layer which exhibits conductibility when irradiated with said photostimulated luminescence light;
- voltage application means for applying voltage across said photoconductive layer so that an electric field is generated; and
- image-signal acquisition means for obtaining an image signal which carries said image information, by scanning said image recording sheet which has said image information recorded thereon with the stimulating light, by guiding photostimulated luminescence light obtained by said scanning so that said photostimulated luminescence light is incident on said photoconductive layer, and by detecting electric charge generated in said photoconductive layer by the incidence of said photostimulated luminescence light under an electric field applied across aid photoconductive layer;
- wherein the stimulable phosphor layer of said image recording sheet is stimulated with
- said stimulating light having a wavelength of 600 nm or greater and emits said photostimulated luminescence light having a wavelength of 500 nm or less;
- the photoconductive layer of said solid-state image detector contains amorphous selenium as a main component thereof and also has a smaller area than that of said image recording sheet; and
- said stimulating-light scanning means performs said scanning by relatively moving said solid-state image detector on a surface of said image recording sheet,
- wherein said voltage application means applies voltage across said photoconductive layer to generate an electric field under which avalanche amplification is obtained within said photoconductive layer.

8. The apparatus as set forth in claim 7, wherein the thickness of said photoconductive layer in said solid-state image detector is within the range of 10 to 50 $\mu$m.

9. The apparatus as set forth in claim 8, further comprising suppression means for suppressing fluctuations in said image signal caused during acquisition of said image signal, said fluctuations resulting from fluctuations in said electric field being applied across said photoconductive layer.

10. The apparatus as set forth in claim 7 further comprising suppression means for suppressing fluctuations in said image signal caused during acquisition of said image signal, said fluctuations resulting from fluctuations in said electric field being applied across said photoconductive layer.

11. The apparatus of claim 10, wherein the suppression means includes a corrective memory table.

12. The apparatuses of claim 7, wherein the electric field has a gradient of at least $10^6$ V/cm.

13. An apparatus for reading image information, comprising:

a light source for emitting stimulating light;

stimulating-light scanning means for scanning an image recording sheet with said stimulating light, said recording image sheet having a stimulable phosphor layer which emits photostimulated luminescence light of a quantity corresponding to stored energy when irradiated with said stimulating light;

a solid-state image detector having a photoconductive layer which exhibits conductibility when irradiated with said photostimulated luminescence light;

voltage application means for applying voltage across said photoconductive layer so that an electric field is generated; and image-signal acquisition means for obtaining an image signal which carries said image information, by scanning said image recording sheet which has said image information recorded thereon with the stimulating light, by guiding photostimulated luminescence light obtained by said scanning so that said photostimulated luminescence light is incident on said photoconductive layer, and by detecting electric charge generated in said photoconductive layer by the incidence of said photostimulated luminescence light under an electric field applied across said photoconductive layer;

wherein the stimulable phosphor layer of said image recording sheet is stimulated with said stimulating light having a wavelength of 600 nm or 2greater and emits said photostimulated luminescence light having a wavelength of 500 nm or less;

the photoconductive layer of said solid-state image detector contains amorphous selenium as a main component thereof and also has a smaller area than that of said image recording sheet; and said stimulating-light scanning means performs said scanning by relatively moving said solid-state image detector on a surface of said image recording sheet, wherein the length of at least one side of said solid-state image detector is one fifth or less of the length of one side of said image recording sheet, wherein said voltage application means applies voltage across said photoconductive layer to generate an electric field under which avalanche amplification is obtained within said photoconductive layer.

14. An apparatus for reading image information, comprising:

a light source for emitting stimulating light;

stimulating-light scanning means for scanning an image recording sheet with said stimulating light said recording image sheet having a stimulable phosphor layer which emits photostimulated luminescence light of a quantity corresponding to stored energy when irradiated with said stimulating light;

a solid-state image detector having a photoconductive layer which exhibits conductibility when irradiated with said photostimulated luminescence light;

voltage application means for applying voltage across said photoconductive layer so that an electric field is generated; and image-signal acquisition means for obtaining an image signal which carries said image information, by scanning said image recording sheet which has said image information recorded thereon with the stimulating light, by guiding photostimulated luminescence light obtained by said scanning so that said photostimulated luminescence light is incident on said photoconductive layer, and by detecting electric charge generated in said photoconductive layer by the incidence of said photostimulated luminescence light under an electric field applied across said photoconductive layer;

wherein the stimulable phosphor layer of said image recording sheet is stimulated with said stimulating light having a wavelength of 600 nm or greater and emits said photostimulated luminescence light having a wavelength of 500 nm or less;

the photoconductive layer of said solid-state image detector contains amorphous selenium as a main component thereof and also has a smaller area than that of said image recording sheet; and said stimulating-light scanning means performs said scanning by relatively moving said solid-state image detector on a surface of said image recording sheet, wherein the thickness of said photoconductive layer of said solid-state image detector is within the range of 0.1 to 100 $\mu$m, wherein said voltage application means applies voltage across said photoconductive layer to generate an electric field under which avalanche amplification is obtained within said photoconductive layer.

15. A solid-state image detector comprising a photoconductive layer which exhibits conductibility when irradiated with photostimulated luminescence light emitted from an image recording sheet, wherein said photoconductive layer contains amorphous selenium as a main component thereof, and further comprising: a first electrode disposed on a first side of the photoconductive layer and a second electrode disposed on a second side of the photoconductive layer, said first and second electrodes operable to generate an electric field sufficient to provide avalanche amplification within the photoconductive layer to detect charges from the photoconductive layer.

16. The solid-state image detector as set forth in claim 15, wherein the length of at least one side of said solid-state image detector is one fifth or less of the length of one side of said image recording sheet.

17. The solid-state image detector as set forth in claim 16, wherein the thickness of said photoconductive layer is within the range of 0.1 to 100 $\mu$m.

18. The solid-state image detector as set forth in claim 15, wherein the thickness of said photoconductive layer is within the range of 0.1 to 100 $\mu$m.

* * * * *